US012725845B2

(12) United States Patent
Qian et al.

(10) Patent No.: US 12,725,845 B2
(45) Date of Patent: Sep. 1, 2026

(54) BATTERY APPARATUS, ENERGY STORAGE APPARATUS, ENERGY STORAGE SYSTEM, ELECTRIC APPARATUS, AND CHARGING NETWORK

(71) Applicant: Contemporary Amperex Technology (Hong Kong) Limited, Hong Kong (CN)

(72) Inventors: Ou Qian, Ningde (CN); Yao Li, Ningde (CN); Jiajin Cai, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 19/315,617

(22) Filed: Aug. 31, 2025

(65) Prior Publication Data

US 2026/0213290 A1 Jul. 23, 2026

Related U.S. Application Data

(63) Continuation of application No. PCT/CN2025/074325, filed on Jan. 23, 2025.

(51) Int. Cl.
*H01M 10/48* (2006.01)
*H01M 4/58* (2010.01)
(Continued)

(52) U.S. Cl.
CPC ....... *H01M 10/482* (2013.01); *H01M 4/5825* (2013.01); *H01M 10/425* (2013.01);
(Continued)

(58) Field of Classification Search
CPC .................................................. H01M 50/178
See application file for complete search history.

(56) References Cited

U.S. PATENT DOCUMENTS

2001/0016279 A1* 8/2001 Shiota .................. H01M 50/55 429/162
2011/0223474 A1* 9/2011 Kim .................... H01M 50/178 429/181

(Continued)

FOREIGN PATENT DOCUMENTS

CN 216850245 U 6/2022
CN 217158566 U 8/2022

(Continued)

OTHER PUBLICATIONS

International Search Report and Written Opinion (with English Machine Translation), mailed Oct. 15, 2025, for International Patent Application Serial No. PCT/CN2025/074325.

*Primary Examiner* — Barbara L Gilliam
*Assistant Examiner* — Jordan E Berresford
(74) *Attorney, Agent, or Firm* — K&L Gates LLP

(57) ABSTRACT

Disclosed are a battery apparatus, an energy storage apparatus, an energy storage system, an electric apparatus, and a charging network. The battery apparatus includes an energy unit and a sampling assembly. The energy unit includes a pouch battery cell and a conductive casing, an accommodating space is formed in the casing, and the pouch battery cell is accommodated in the accommodating space. The pouch battery cell includes a first electrode lead-out part and a second electrode lead-out part with opposite polarities. the first electrode lead-out part of at least one of the pouch battery cell is electrically connected to the casing, and the second electrode lead-out part is insulated from the casing. The sampling assembly is electrically connected to the second electrode lead-out part and the casing.

19 Claims, 5 Drawing Sheets

(51) Int. Cl.

| | |
|---|---|
| ***H01M 10/42*** | (2006.01) |
| ***H01M 10/46*** | (2006.01) |
| ***H01M 50/105*** | (2021.01) |
| ***H01M 50/178*** | (2021.01) |
| ***H01M 50/211*** | (2021.01) |
| ***H01M 50/293*** | (2021.01) |
| ***H01M 50/342*** | (2021.01) |
| ***H01M 50/507*** | (2021.01) |

(52) U.S. Cl.
CPC ......... *H01M 10/46* (2013.01); *H01M 50/105* (2021.01); *H01M 50/178* (2021.01); *H01M 50/211* (2021.01); *H01M 50/293* (2021.01); *H01M 50/3425* (2021.01); *H01M 50/507* (2021.01); *H01M 2010/4271* (2013.01); *H01M 2220/20* (2013.01)

(56) References Cited

U.S. PATENT DOCUMENTS

| | | | | |
|---|---|---|---|---|
| 2013/0136963 | A1* | 5/2013 | Chiba | H01M 10/34 429/61 |
| 2022/0239121 | A1* | 7/2022 | Li | H02J 7/00036 |
| 2023/0035703 | A1* | 2/2023 | Tang | H01M 50/284 |
| 2023/0291048 | A1* | 9/2023 | Zhou | H01M 50/278 |
| 2025/0253431 | A1* | 8/2025 | Wu | H01M 10/625 |

FOREIGN PATENT DOCUMENTS

| | | | | |
|---|---|---|---|---|
| CN | 119208851 A | | 12/2024 | |
| KR | 20230170558 A | * | 12/2023 | H01M 50/358 |
| WO | 2024/000505 A1 | | 1/2024 | |

* cited by examiner

BATTERY APPARATUS, ENERGY STORAGE APPARATUS, ENERGY STORAGE SYSTEM, ELECTRIC APPARATUS, AND CHARGING NETWORK

CROSS-REFERENCE TO RELATED APPLICATIONS

This application is a continuation of International Application No. PCT/CN2025/074325, filed on Jan. 23, 2025, and entitled "BATTERY APPARATUS, ENERGY STORAGE APPARATUS, ENERGY STORAGE SYSTEM, ELECTRIC APPARATUS, AND CHARGING NETWORK", which is incorporated herein by reference in its entirety.

TECHNICAL FIELD

This application relates to the field of batteries, and in particular, to a battery apparatus, an energy storage apparatus, an energy storage system, an electric apparatus, and a charging network.

BACKGROUND

A manufacturing process of a CTP (Cell To Pack) battery pack is simplified from battery cell-module-pack to battery cell-pack, eliminating the intermediate module, thus significantly reducing the pack weight and increasing the energy density. In related art, to ensure reliable use of a CTP battery pack, a BIC (Battery Information Controller, battery information controller) is typically disposed to collect a voltage across a positive electrode and a negative electrode of any battery cell in the battery pack.

Poles of a soft pack battery cell are arranged on two sides. To collect a voltage of the battery cell, low-voltage harnesses need to be added to the two sides of the battery cell to perform voltage sampling. Then, summary sampling is simultaneously performed on the two low-voltage harnesses. This method demands many low-voltage harnesses and connectors, leading to complex harness layout and high cost.

SUMMARY

In view of the above issues, this application provides a battery apparatus, an energy storage apparatus, an energy storage system, an electric apparatus, and a charging network, which can alleviate the complexity in sampling harness layout in battery apparatuses.

According to a first aspect, this application provides a battery apparatus. The battery apparatus includes an energy unit and a sampling assembly; where the energy unit includes a pouch battery cell and a conductive casing, an accommodating space is formed in the casing, and the pouch battery cell is accommodated in the accommodating space;

the pouch battery cell includes a first electrode lead-out part and a second electrode lead-out part with opposite polarities, where the first electrode lead-out part of at least one of the pouch battery cell is electrically connected to the casing, and the second electrode lead-out part is insulated from the casing; and the sampling assembly is electrically connected to the second electrode lead-out part and the casing.

In the technical solution of the embodiments of this application, with the first electrode lead-out part electrically connected to the conductive casing, the conductive casing has the same electric potential as the first electrode lead-out part, so that voltage sampling can be performed on the pouch battery cell on the side of the second electrode lead-out part, making it convenient for sampling harness layout and reducing the number of sampling harnesses.

In some embodiments, the casing has a connecting part, the connecting part is configured to electrically connect to the sampling assembly, a distance between the first electrode lead-out part and the second electrode lead-out part is larger than a distance between the connecting part and the second electrode lead-out part.

In the above technical solution, the first electrode lead-out part is electrically connected to the casing, and the connecting part of the casing is electrically connected to the sampling assembly. With the distance between the first electrode lead-out part and the second electrode lead-out part larger than the distance between the connecting part and the second electrode lead-out part, the circuit electrically connecting the sampling assembly to the connecting part and the second electrode lead-out part is simpler, and the number of sampling harnesses can also be reduced.

In some embodiments, the first electrode lead-out part and the second electrode lead-out part are respectively located at two end faces of the pouch battery cell opposite along a first direction, and along the first direction, the distance between the sampling assembly and the first electrode lead-out part is larger than the distance between the sampling assembly and the second electrode lead-out part.

In the above technical solution, the sampling assembly being connected to the second electrode lead-out part facilitates sampling harness layout and reduces the number of sampling harnesses. The sampling assembly performs sampling only on the side of the second electrode lead-out part of the pouch battery cell. This offers a simpler connection circuit and requires fewer connection harnesses as compared with performing sampling on two sides of the battery apparatus.

In some embodiments, the energy unit includes a first electrode connecting part and a second electrode connecting part, the first electrode connecting part is electrically connected to the first electrode lead-out part, the second electrode connecting part is electrically connected to the second electrode lead-out part, along the first direction, the first electrode connecting part and the second electrode connecting part are respectively located at two ends of the casing, and the sampling assembly is located on a side of the pouch battery cell provided with the second electrode connecting part.

In the above technical solution, with the first electrode connecting part electrically connected to the first electrode lead-out part, and the second electrode connecting part electrically connected to the second electrode lead-out part, the sampling assembly can be disposed on the side of the second electrode connecting part to sample the energy unit.

In some embodiments, the casing includes a first opening and two second openings opposite along a first direction, and the first opening is located on a side of the two second openings along a second direction and communicates with the two second openings, the second direction intersecting the first direction; and the casing further includes a first casing wall, the first casing wall is opposite to the first opening along the second direction, the energy unit includes a first electrode connecting part and a second electrode connecting part respectively located at two ends of the first casing wall along the first direction, the energy unit includes a first busbar frame and a second busbar frame opposite along the first direction, the first busbar frame is electrically connected to the first electrode connecting part and the first electrode lead-out part, and the second busbar frame is electrically connected to the second electrode connecting part and the second electrode lead-out part.

In the above technical solution, through the first busbar frame and the second busbar frame, the positive electrode and the negative electrode of the pouch battery cell can be led out to the positions of the first electrode connecting part and the second electrode connecting part on the first casing wall, thereby allowing the sampling assembly to perform sampling on the side of the first casing wall.

In some embodiments, the first electrode connecting part is connected to both the first electrode lead-out part and the casing, so that the first electrode lead-out part is indirectly electrically connected to the casing through the first electrode connecting part.

In the above technical solution, with the first electrode connecting part electrically connected to the first electrode lead-out part and the casing, the casing has the same electric potential as the first electrode lead-out part.

In some embodiments, the first busbar frame is connected to both the first electrode lead-out part and the casing, so that the first electrode lead-out part is indirectly electrically connected to the casing through the first busbar frame.

In the above technical solution, the first busbar frame achieves electrical connection between the casing and the first electrode lead-out part. During installation, the first busbar frame is connected to both the first electrode lead-out part and the casing to allow for the same electric potential between the casing and the first electrode lead-out part.

In some embodiments, the first electrode lead-out part is directly connected to the casing to be electrically connected to the casing.

In the above technical solution, the casing is directly electrically connected to the first electrode lead-out part, establishing continuity between the first electrode lead-out part and the casing, and allowing for the same electric potential of the casing and the first electrode lead-out part.

In some embodiments, the sampling assembly is located on an outer side of the first casing wall facing away from the accommodating space, and the sampling assembly is electrically connected to both the second electrode connecting part and the casing.

In the above technical solution, the sampling assembly is on the side of the second electrode connecting part, and electrically connecting it to the second electrode connecting part and the casing can allow for sampling of the positive electrode and negative electrode of the pouch battery cell.

In some embodiments, the battery apparatus includes an electrical connecting piece, and the electrical connecting piece is connected to the first electrode lead-out part and the casing in series.

In the above technical solution, the electrical connecting piece is disposed between the first electrode lead-out part of the pouch battery cell and the casing and is electrically connected to the first electrode lead-out part and the casing, establishing continuity between the first electrode lead-out part and the casing to allow for the same electric potential between the casing and the first electrode lead-out part. Thus, once the sampling assembly is electrically connected to the connecting part of the casing, voltage monitoring can be implemented on the side of the second electrode lead-out part of the pouch battery cell.

In some embodiments, a resistance value of the electrical connecting piece is larger than or equal to 1 Ω.

In the above technical solution, the resistance value of the electrical connecting piece can prevent damage to the pouch battery cell caused by a high voltage between the positive electrode and the negative electrode of the pouch battery cell in a case of a short circuit between the two electrodes or between casings of two pouch battery cells. Thus, the electrical connecting piece can protect the battery apparatus.

In some embodiments, the electrical connecting piece is configured to limit a current flowing through the casing to less than or equal to 20 A.

In the above technical solution, the electrical connecting piece is disposed between the first electrode lead-out part and the casing, limiting the current flowing through the casing to less than or equal to 20 A, and preventing damage to the pouch battery cell caused by a high voltage between the positive electrode and the negative electrode of the pouch battery cell in a case of a short circuit between the two electrodes or between the casings of two pouch battery cells. Thus, the electrical connecting piece can protect the battery apparatus.

In some embodiments, a maximum withstand voltage of the electrical connecting piece is 100 V (volt).

In the above technical solution, the maximum withstand voltage of the electrical connecting piece refers to the maximum voltage that the electrical connecting piece can withstand during design and manufacturing, essentially the highest voltage value that the electrical connecting piece can support. Under specified conditions, the electrical connecting piece can withstand a maximum voltage of 100 V without breakdown or damage. Thus, the reliability of the electrical connecting piece can be ensured.

In some embodiments, the electrical connecting piece includes at least one of conductive foam and conductive adhesive.

In the above technical solution, the conductive foam and the conductive adhesive have good conductivity, allowing for a solid electrical connection between the first electrode lead-out part and the casing. Additionally, the flexibility of the foam material allows the conductive foam to adhere to various irregular surfaces, offering tight contact and conduction. Under pressure, the conductive foam can maintain its shape and conductivity, resisting deformation or damage and featuring good durability. The conductive adhesive not only provides conductive connectivity but also has high binding strength, and therefore can securely adhere the first electrode lead-out part to the connecting part of the casing.

In some embodiments, the battery apparatus includes a first busbar frame, the first busbar frame is electrically connected to the first electrode lead-out part, and the electrical connecting piece connects the first busbar frame and the casing to connect the first busbar frame and the casing in series.

In the above technical solution, the first busbar frame is used for electrical connection between the first electrode lead-out parts of the pouch battery cells. The first busbar frame being electrically connected to the first electrode lead-out part can allow the pouch battery cells in the energy unit to be connected in series, forming a complete battery system. This ensures smooth current flow between the pouch battery cells, enabling the battery system to output a higher current and higher voltage. Electrically connecting the first busbar frame and the casing through the electrical connecting piece can implement an electrical connection between the first electrode lead-out part and the electrical connecting piece.

In some embodiments, the energy unit includes a first electrode connecting part and a second electrode connecting part, the first electrode connecting part is electrically connected to the first electrode lead-out part, the second electrode connecting part is electrically connected to the second electrode lead-out part, the battery apparatus further includes an insulator, and the insulator insulatively connects the second electrode connecting part and the casing.

In the above technical solution, the insulator being disposed between the second electrode lead-out part and the casing can ensure an insulative connection between the second electrode lead-out part and the casing, preventing a short-circuit connection between the positive electrode and negative electrode of the pouch battery cell and ensuring reliable operation of the battery apparatus.

In some embodiments, the energy unit includes a first electrode connecting part, a second electrode connecting part, a first busbar frame, and a second busbar frame, the first busbar frame electrically connects the first electrode connecting part and the first electrode lead-out part, and the second busbar frame electrically connects the second electrode connecting part and the second electrode lead-out part; and the battery apparatus further includes an insulator, and the insulator insulatively connects the second busbar frame and the casing.

In the above technical solution, the insulative connection between the second busbar frame and the casing can be ensured, preventing a short-circuit connection between the positive electrode and negative electrode of the pouch battery cell and ensuring reliable operation of the battery apparatus.

In some embodiments, the insulator is made of a plastic material.

In the above technical solution, the plastic material has good insulation performance, can withstand a certain voltage and current, and has good insulation performance, reliability, and stability.

In some embodiments, a resistance of the insulator is larger than or equal to 1 MΩ.

In the above technical solution, the insulative connection between the second electrode lead-out part and the casing is achieved by disposing the insulator. The insulator has a resistance value larger than or equal to 1 MΩ so that the insulator has a higher ability to impede a current, thereby reducing electric leakage and ensuring the reliable operation of the battery apparatus.

In some embodiments, the battery apparatus includes multiple energy units, each energy unit includes one casing and multiple pouch battery cells arranged side by side in the casing, first electrode lead-out parts of the multiple pouch battery cells located in the same casing all face a same side and are connected to each other, and second electrode lead-out parts of the multiple pouch battery cells located in the same casing all face a same side and are connected to each other.

In the above technical solution, the battery apparatus includes the multiple energy units, the first electrode lead-out parts in the energy units all face towards the same side and are connected to each other, and the second electrode lead-out parts all face towards the same side and are connected to each other. Thus, in one energy unit, the first electrode lead-out part and the second electrode lead-out part are respectively located on two sides of the casing along the first direction. This makes it convenient to arrange the sampling assembly on one side of the energy unit.

In some embodiments, an elastic piece is disposed between adjacent pouch battery cells in a same energy unit, and/or an elastic piece is arranged between the pouch battery cell and the inner wall of the casing along a direction in which the multiple pouch battery cells are arranged side by side.

In the above technical solution, after swelling, the pouch battery cell can compress the elastic piece, and the elastic piece can absorb the swelling, thereby reducing the outward swelling of the casing to some extent and decreasing the probability of deformation of the casing.

In some embodiments, the battery apparatus includes multiple energy units, the multiple energy units are arranged in groups, and an insulating layer is disposed on an outer surface of the casing, so that casings of two adjacent energy units of the multiple energy units arranged are mutually insulated.

In the above technical solution, the multiple energy units can enhance the performance of the battery apparatus, and the insulating layer can ensure insulation between the casings to some degree, thus providing reliability to the battery apparatus.

In some embodiments, the energy unit includes a first electrode connecting part and a second electrode connecting part, the first electrode connecting part is electrically connected to the first electrode lead-out part, the second electrode connecting part is electrically connected to the second electrode lead-out part, the multiple energy units are sequentially arranged, and the first electrode connecting parts and second electrode connecting parts of two adjacent energy units have opposite orientations in terms of relative positions, where the adjacent energy units are connected in series.

In the above technical solution, it can be convenient to connect adjacent energy units in series, thereby increasing the power supply voltage of the battery apparatus.

In some embodiments, the energy unit includes a first electrode connecting part and a second electrode connecting part, the first electrode connecting part is electrically connected to the first electrode lead-out part, and the second electrode connecting part is electrically connected to the second electrode lead-out part; and the battery apparatus includes multiple energy units arranged in groups, the battery apparatus further includes busbars, the busbars are configured to connect different energy units, the busbar is connected to at least one first electrode lead-out part, and the busbar is connected to the casing of at least one of the energy units, so that the first electrode lead-out part is indirectly electrically connected to the casing through the busbar.

In the above technical solution, the busbar can be used to electrically connect the first electrode lead-out part to the casing.

In some embodiments, the multiple energy units arranged in groups include alternately arranged first energy units and second energy units, the casing of the first energy unit is electrically connected to the busbar, and a casing of the second energy unit is insulated from the busbar.

In the above technical solution, since the busbar is connected to the multiple energy units, the electric potential of the busbar can be transmitted using the casing of only one energy unit. This allows for alternate arrangement of charged casings and uncharged casings of the multiple energy units arranged in groups, and therefore allows for a far distance between casings with different electric potentials, thereby reducing the short circuit risk and enhancing reliability.

In some embodiments, the casing includes a first opening and two second openings opposite along a first direction, and the first opening is located on a side of the two second openings along a second direction and communicates with the two second openings, the second direction intersecting the first direction; and the battery apparatus includes a box, the energy unit is located on an inner bottom wall of the box, the casing includes two first end walls forming the first opening, the first end wall is disposed facing towards the inner bottom wall, and an inner wall surface, an outer wall surface, and a transition wall surface connecting the inner wall surface and the outer wall surface of the first end wall are all provided with an insulating layer.

In the above technical solution, insulation can be achieved between the casing and the inner bottom wall of the box.

In some embodiments, the casing includes a first opening and two second openings opposite along a first direction, and the first opening is located on a side of the two second openings along a second direction and communicates with the two second openings, the second direction intersecting the first direction; and the battery apparatus includes a box, the energy unit is located on an inner bottom wall of the box, the casing includes two first end walls forming the first opening, and the first end wall and the inner bottom wall of the box are insulatively connected by an insulating adhesive.

In the above technical solution, insulation can be achieved between the casing and the inner bottom wall of the box.

In some embodiments, the casing includes a first opening and two second openings opposite along a first direction, and the first opening is located on a side of the two second openings along a second direction and communicates with the two second openings, the second direction intersecting the first direction; and the casing further includes a first casing wall, the first casing wall is opposite to the first opening along the second direction, the sampling assembly is located on an outer side of the first casing wall, and the first casing wall further is disposed with a pressure relief structure.

In the above technical solution, when the pouch battery cell undergoes gas discharge to relieve pressure caused by thermal runaway induced swelling, the pressure relief structure directs discharged gas to relieve pressure, reducing the risk of running-around gas affecting surrounding pouch battery cells and thus lowering the risk of serious thermal runaway of the energy unit. This is conducive to thermal runaway management of the battery apparatus and enhances the reliability of the battery apparatus.

In some embodiments, the sampling assembly and the pressure relief structure are disposed in a staggered manner on the first casing wall.

In the above technical solution, when the energy unit undergoes gas discharge to relieve pressure, the sampling assembly is protected to some extent.

In some embodiments, the casing has a connecting part, the connecting part is configured to electrically connect to the sampling assembly, the energy unit includes a first electrode connecting part and a second electrode connecting part, the first electrode connecting part is electrically connected to the first electrode lead-out part, the second electrode connecting part is electrically connected to the second electrode lead-out part, the sampling assembly is disposed between the connecting part and the second electrode connecting part, and a pressure relief structure is disposed between the connecting part and the first electrode connecting part.

In the above technical solution, the sampling assembly can be disposed far from the pressure relief structure, further reducing or avoiding damage to the sampling assembly during gas discharge of the pressure relief structure.

In some embodiments, the battery apparatus includes a box, the energy unit is located in the box, and the casing is connected to the box by a thermal conductive adhesive.

In the above technical solution, with the box and the casing fixedly connected by thermal conductive adhesive, first, the box and the casing can be reliably connected and fixed, and second, heat exchange of the battery apparatus is facilitated.

In some embodiments, the box includes a box body and a heat exchange plate, the heat exchange plate is connected to the box body and jointly defines a receiving space with the box body, and the energy unit is adhered to the heat exchange plate.

In the above technical solution, with the energy unit adhered to the heat exchange plate, the heat exchange plate can efficiently exchange heat with the pouch battery cell, quickly adjusting the temperature of the pouch battery cell. This helps to enhance the reliability of the pouch battery cell, thereby improving the reliability of the battery apparatus.

In some embodiments, the heat exchange plate is disposed at a bottom of the box body.

In the above technical solution, because the heat exchange plate is arranged between the pouch battery cell and the bottom wall of the box, the heat exchange plate not only provides efficient heat exchange to the pouch battery cell but also plays a protective function. The heat exchange plate can play a cushion function when the bottom of the box is subjected to external mechanical impact, reducing damage caused by external mechanical impact to the pouch battery cell. This can reduce the risk of damage to the pouch battery cell and increase the reliability of the energy unit, thereby improving the reliability of the battery apparatus.

In some embodiments, the pouch battery cell is any one of lithium iron phosphate battery cell, ternary battery cell, and solid-state battery cell.

In the above technical solution, using pouch battery cells of the above types can provide more options for the design of the battery apparatus to meet different usage needs. As a lithium iron phosphate battery cell, the pouch battery cell has advantages of high reliability, long cycle life, light weight, large capacity, and low internal resistance. As a ternary battery cell, the pouch battery cell has advantages of high energy density and good electrochemical performance. As a solid-state battery cell, the pouch battery cell has advantages of high energy density, high reliability, light weight, and good high- and low-temperature performance.

In some embodiments, the pouch battery cell is a lithium iron phosphate battery cell, and in a positive electrode material of the pouch battery cell, a ratio of a positive electrode active material, a binder, and a conductive agent is 96:(1-3):(1-3); or the pouch battery cell is a ternary battery cell, and in a positive electrode material of the pouch battery cell, a ratio of a positive electrode active material, a binder, and a conductive agent is 96:(2-3):(1-2).

In the above technical solution, when the pouch battery cell is a lithium iron phosphate battery cell, the high proportion of the positive electrode active material means that a larger amount of the substance that can undergo electrochemical reactions can be accommodated within a limited electrode assembly, which is conducive to increasing the capacity and energy density of the battery apparatus. This can allow the lithium iron phosphate battery cell to output more electricity in a case of a small volume and weight, meeting application scenarios with certain energy density requirements. The usage amounts of the binder and the conductive agent falling within the above range reduces the cost of auxiliary materials, thereby lowering the overall cost of the battery apparatus. When the pouch battery cell is a ternary battery cell, due to the relatively complex structure and surface properties of ternary materials, using the positive electrode active material, the binder, and the conductive agent of the above usage ratio helps to ensure good adhesion between positive electrode active material particles and between the active material and the current collector, thereby improving the mechanical stability and integrity of the electrode assembly. This helps to reduce the risk of active material shedding and electrode pulverization during charge and discharge, and extend the cycle life of the battery apparatus.

In some embodiments, the pouch battery cell is a ternary battery cell, the casing includes a first opening, multiple pouch battery cells are accommodated in the casing, the casing further includes a first casing wall, the first casing wall is opposite to the first opening along the second direction, and the first casing wall is disposed with a pressure relief structure.

In the above technical solution, when the ternary battery cell undergoes gas discharge to relieve pressure caused by thermal runaway induced swelling, the pressure relief structure can direct discharged gas to relieve pressure, reducing the risk of running-around gas affecting surrounding ternary battery cells and thus lowering the risk of serious thermal runaway of the energy unit formed by the ternary battery cells. This is conducive to thermal runaway management of the energy unit and enhances the reliability of the energy unit formed by the ternary battery cells.

In some embodiments, the pressure relief structure is configured as a pressure relief hole; or the pressure relief structure is configured as a notch; or the pressure relief structure is configured as a weakened part.

In the above technical solution, more options can be provided for the design of the pressure relief structure to meet different usage needs.

According to a second aspect, this application provides an energy storage apparatus including multiple battery apparatuses according to any one of the multiple embodiments, where the battery apparatus is configured to store or provide electrical energy.

According to a third aspect, this application provides an energy storage system including a power conversion apparatus and the energy storage apparatus according to the above embodiment, where the power conversion apparatus is configured to electrically connect a power generation apparatus and the energy storage apparatus.

According to a fourth aspect, this application provides an electric apparatus including the battery apparatus any one of the above embodiments, the energy storage apparatus according to the above embodiment, or the energy storage system according to the above embodiment, where the battery apparatus, the energy storage apparatus, or the energy storage system is configured to provide electrical energy to the electric apparatus.

According to a fifth aspect, this application provides a charging network including a charging pile and the energy storage apparatus according to the above embodiment or the energy storage system according to the above embodiment, where the energy storage apparatus or the energy storage system is configured to provide electrical energy to the charging pile.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, like parts are denoted by like reference signs. In the accompanying drawings.

Figure 1:
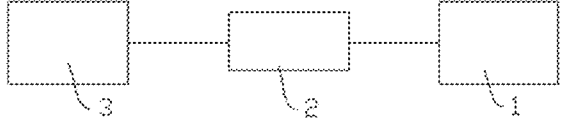
FIG. 1 is a schematic structural diagram of an energy storage system according to some embodiments of this application.

Reference signs in specific embodiments are as follows:

vehicle 1000;

energy storage apparatus 1; power conversion apparatus 2; power generation device 3; charging pile 4; connector 5;

energy unit 10; first energy unit **10*a*; second energy unit 10*b*; first electrode connecting part 101; second electrode connecting part 102; pouch battery cell 11; first electrode lead-out part 111; second electrode lead-out part 112; casing 12; first casing wall 121; first opening 122; second opening 123; first end wall 124; connecting part 13; heat exchange plate 14; thermal conductive adhesive 15; pressure relief structure 16**;

sampling assembly 20; electrical connecting piece 30; first busbar frame 40; insulator 50; second busbar frame 60;

box 70; first box body 71; second box body 72; elastic piece 80; insulating layer 81; protective member 90; busbar 91;

battery apparatus 100; controller 200; and motor 300.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "have" and any other variations thereof in the specification, the claims and the foregoing brief description of drawings of this application are intended to cover a non-exclusive inclusion.

Unless otherwise specified, all the embodiments and optional embodiments of this application can be combined with each other to form new technical solutions.

Unless otherwise specified, all the technical features and optional technical features of this application can be combined with each other to form new technical solutions.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiment.

In the descriptions of embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial" , "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in the embodiments of this application as suitable to specific situations.

With the rapid development of global new energy technologies, the application scope of power batteries as critical energy storage apparatuses is expanding at an unprecedented pace. They are not only indispensable energy storage solutions in renewable energy plants such as hydropower, thermal power, wind power, and solar energy, but are also deeply integrated into the field of electric transportation, becoming the core power sources for green travel modes such as electric bicycles, electric motorcycles, and even electric cars.

As a key component of new energy technologies, the application scope of power batteries is continuously expanding, and the market demand is steadily growing. In fields such as renewable energy, electric transportation, military equipment, and aerospace, power batteries play an indispensable role.

With the development of power battery technologies, there is an increasing requirement for the energy density of power batteries, and soft pack batteries are gradually becoming an important application type of power batteries. Casings of soft pack batteries utilize an aluminum-plastic composite film, and due to the lightweight characteristics of the aluminum-plastic film, soft pack batteries are lighter at the same capacity, thus providing a higher energy density.

A soft pack battery takes a CTP (Cell To Pack, battery cell-module-pack) structure, and a manufacturing process of the battery pack is simplified from battery cell-module-pack to cell-pack, eliminating the intermediate module, thus significantly reducing the pack weight and increasing the energy density. In related art, to ensure reliable use of a CTP battery pack, a BIC (Battery Information Controller, battery information controller) is typically disposed to collect a voltage across a positive electrode and a negative electrode of any cell in the battery pack.

However, poles of a soft pack battery are arranged on two sides. To collect a voltage of the cell, low-voltage harnesses need to be added to the two sides of the battery to perform voltage sampling. Then summary sampling is simultaneously performed on the two low-voltage harnesses. This method demands two low-voltage harnesses and three connectors in one battery module, and therefore more connectors are needed to monitor corresponding voltages, leading to complex harness layout and high cost.

In view of the above considerations, to solve or alleviate the complex sampling harness layout in battery apparatuses, this application provides a battery apparatus, where the battery apparatus includes an energy unit and a sampling assembly.

The energy unit includes a pouch battery cell and a conductive casing, an accommodating space is formed in the casing, and the pouch battery cell is accommodated in the accommodating space.

The pouch battery cell includes a first electrode lead-out part and a second electrode lead-out part with opposite polarities, where the first electrode lead-out part is electrically connected to the casing, and the second electrode lead-out part is insulatively connected to the casing.

The sampling assembly is electrically connected to the second electrode lead-out part and the casing.

In such battery apparatus, with the first electrode lead-out part electrically connected to the conductive casing, the conductive casing has the same electric potential as the first electrode lead-out part, so that voltage sampling can be performed on the pouch battery cell on the side of the second electrode lead-out part, making it convenient for sampling harness layout and reducing the number of sampling harnesses.

The battery apparatus (Battery Apparatus) mentioned in the embodiments of this application may include one or more battery cell assemblies for providing a voltage and capacity. The battery cell assembly (Battery Cell Assembly) may include multiple battery cells, and the multiple battery cells are connected in series, parallel, or series-parallel via a busbar component.

In some embodiments, the battery cell assembly (Battery Cell Assembly) is usually formed by arranging multiple battery cells.

For example, the battery cell assembly can be a battery module (Battery Module), and the battery module is an independent module formed by arranging and fixing multiple battery cells. For example, the battery module can be formed by binding multiple battery cells with ties.

In some embodiments, the battery apparatus can be a battery pack (battery Pack), and the battery pack includes a box and one or more battery cell assemblies, where the battery cell assembly is accommodated in the box.

For example, the battery cell assembly may serve as a battery module, and the battery cell assembly may be accommodated in the box by fixing the battery module in the box.

For example, the battery cell assembly can alternatively be accommodated in the box by directly fixing multiple battery cells in the box.

For example, the box may include a first box body and a second box body. The first box body and the second box body fit together to form a closed space inside the box to house the battery cell assembly. The "closed" mentioned here refers to covering or closing, which may be sealed or unsealed. The first box body can be a top cover or a bottom plate.

For example, the box may include a top cover, a frame, and a bottom plate. The top cover and bottom plate are connected separately to the frame, creating a closed space in the box to house the battery cell assembly.

In some embodiments, the box may be used as part of a chassis structure of a vehicle. For example, a part of the box may be at least a part of the chassis structure of the vehicle. Alternatively, a part of the box may be at least a part of cross members and roof rails of the vehicle.

The technical solutions described in the embodiments of this application are applicable to various electric apparatuses that use battery cells, such as mobile phones, portable devices, notebook computers, electric bicycles, electric toys, electric tools, vehicles, ships, and spacecrafts. For example, spacecrafts include airplanes, rockets, space shuttles, and spaceships. An embodiment of this application provides an energy storage apparatus including one or more battery clusters (Battery Cluster) to increase the voltage and capacity of the energy storage apparatus. The battery cluster may include multiple battery apparatuses, and the multiple battery apparatuses are connected in series by a busbar component to increase the voltage of the energy storage apparatus. When the energy storage apparatus includes multiple battery clusters, the multiple battery clusters are connected in parallel to increase the capacity of the energy storage apparatus.

For ease of description in the following embodiments, an electric apparatus of an embodiment of this application being a vehicle 1000 is used as an example for description.

Figure 3:
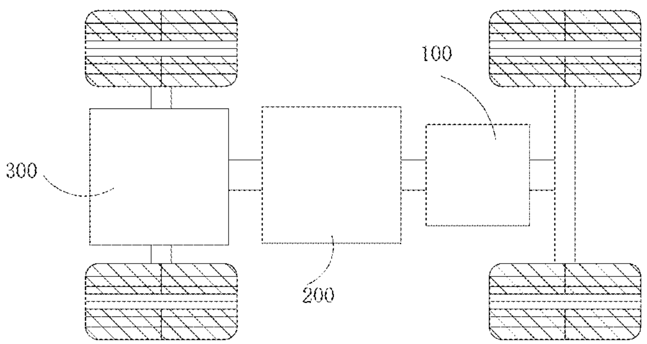
FIG. 3 is a schematic structural diagram of a vehicle according to some embodiments of this application.

Referring to FIG. 3, FIG. 3 is a schematic structural diagram of the vehicle 1000 according to some embodiments of this application. The vehicle 1000 may be a fossil fuel vehicle, a natural gas vehicle, or a new energy vehicle. The new energy vehicle may be a battery electric vehicle, a hybrid electric vehicle, a range-extended electric vehicle, or the like. A battery apparatus 100 is disposed inside the vehicle 1000, and the battery apparatus 100 can be disposed at the bottom, front, or rear of the vehicle 1000. The battery apparatus 100 may be configured to supply power to the vehicle 1000. For example, the battery apparatus 100 may be used as an operational power source for the vehicle 1000. The vehicle 1000 may further include a controller 200 and a motor 300, where the controller 200 is configured to control the battery apparatus 100 to supply power to the motor 300, for example, to satisfy a working electricity need during start, navigation, and driving of the vehicle 1000.

In some embodiments of this application, the battery apparatus 100 can be used as not only the operational power source for the vehicle 1000 but also a driving power source for the vehicle 1000, replacing or partially replacing fossil fuel or natural gas to provide driving traction for the vehicle 1000.

Figure 4:
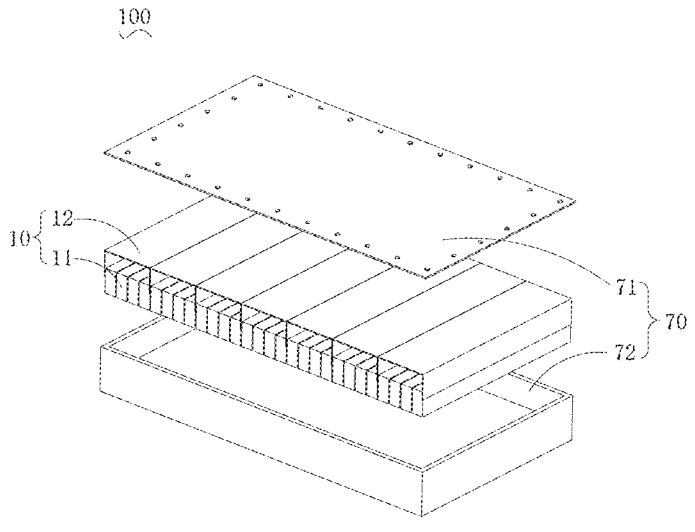
FIG. 4 is a schematic structural exploded view of a battery apparatus according to some embodiments of this application.

Referring to FIG. 4, FIG. 4 is a schematic structural exploded view of a battery apparatus 100 according to some embodiments of this application. The battery apparatus 100 includes a box 70 and an energy unit 10, and the energy unit 10 is accommodated in the box 70. The box 70 provides a closed space for the energy unit 10, and the box 70 may adopt various structures.

In some embodiments, the box 70 may include a first box body 71 and a second box body 72. The first box body 71 and the second box body 72 fit together. The first box body 71 and the second box body 72 jointly define a closed space for accommodating the energy unit 10.

The second box body 72 may be a hollow structure with one end open, the first box body 71 may be a plate structure, and the first box body 71 covers or snaps onto an open side of the second box body 72, so that the first box body 71 and the second box body 72 jointly define a closed space. The first box body 71 and the second box body 72 may both be a hollow structure with one side open, and the open side of the first box body 71 covers or snaps onto the open side of the second box body 72.

Certainly, the box 70 formed by the first box body 71 and the second box body 72 may be in various shapes, for example, cylindrical or cuboid.

Figure 5:
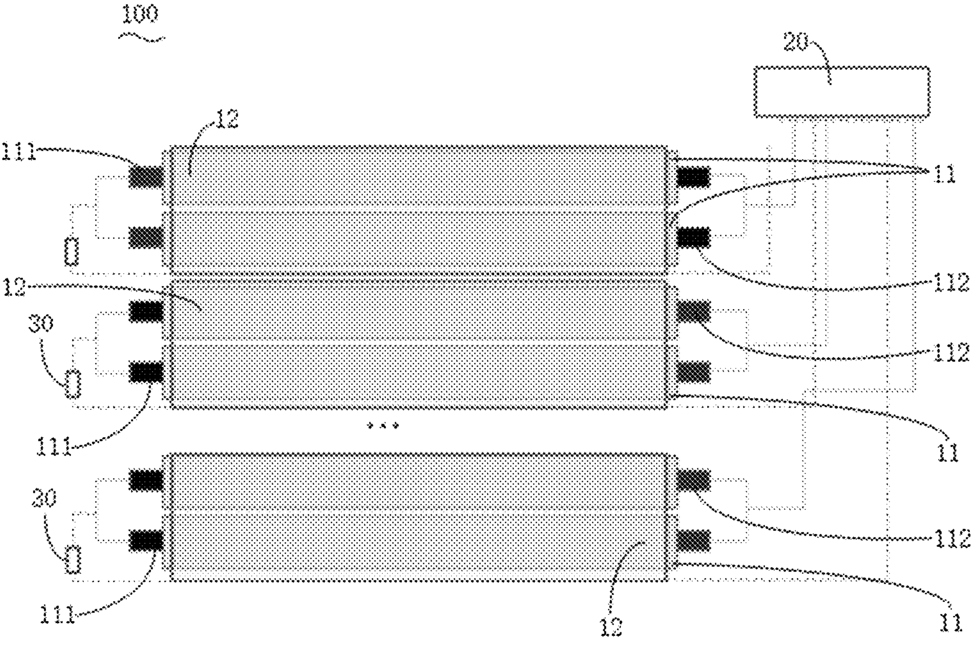
FIG. 5 is a schematic structural diagram of a battery apparatus according to some embodiments of this application.
Figure 6:
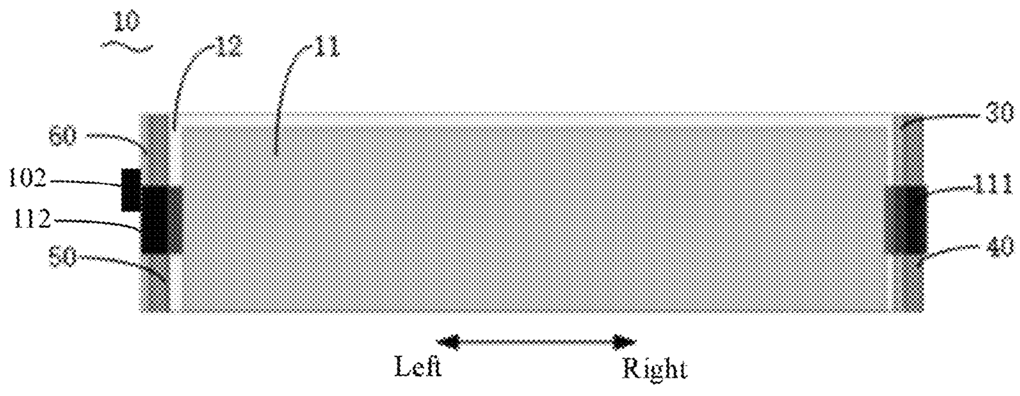
FIG. 6 is a schematic structural diagram of an energy unit according to some embodiments of this application.

In some embodiments, as shown in FIGS. 5 and 6, this application provides a battery apparatus 100, and the battery apparatus 100 includes an energy unit 10 and a sampling assembly 20.

The energy unit 10 includes a pouch battery cell 11 and a conductive casing 12, an accommodating space is formed in the casing 12, and the pouch battery cell 11 is accommodated in the accommodating space. The pouch battery cell 11 includes a first electrode lead-out part 111 and a second electrode lead-out part 112 with opposite polarities.

The first electrode lead-out part 111 of at least one pouch battery cell 11 is electrically connected to the casing 12, and the second electrode lead-out part 112 is insulatively connected to the casing 12. The sampling assembly 20 is electrically connected to the second electrode lead-out part 112 and the casing 12.

In the technical solution of the embodiments of this application, with the first electrode lead-out part 111 electrically connected to the conductive casing 12, the conductive casing 12 has the same electric potential as the first electrode lead-out part 111, so that voltage sampling can be performed on the pouch battery cell 11 on the side of the second electrode lead-out part 112, making it convenient for sampling harness layout and reducing the number of sampling harnesses.

Specifically, the battery apparatus 100 includes the energy unit 10 and the sampling assembly 20, where the energy unit 10 is configured to provide a voltage and capacity, and the sampling assembly 20 is configured to collect a voltage parameter of the energy unit 10 to ensure reliable operation of the battery apparatus 100.

The energy unit 10 includes the conductive casing 12 and at least one pouch battery cell 11, and the casing is configured to house and fix the at least one pouch battery cell 11.

For example, the electrode assembly of the pouch battery cell 11 is housed in an aluminum-plastic film bag, with the edges of the bag sealed through thermal pressing, forming a sealed portion. The electrode lead-out part extends outside the bag, allowing for charging and discharging of the battery cell.

The casing 12 is formed with an accommodating space for pouch battery cells 11, and the pouch battery cells 11 are arranged therein in a certain order.

The pouch battery cell 11 includes a first electrode lead-out part 111 and a second electrode lead-out part 112 with opposite polarities, where the first electrode lead-out part 111 is electrically connected to the casing 12, and the second electrode lead-out part 112 is insulatively connected to the casing 12. As such, the casing 12 has the same electric potential as the first electrode lead-out part 111.

The sampling assembly 20 of the battery apparatus 100 is a key part of the battery management system (Battery Management System, BMS), responsible for collecting key parameter data like the voltage, temperature, and current of the battery, and transmitting them in real time to a monitoring center for analysis and processing.

The sampling assembly 20 ensures the battery to operate within a reliable voltage range by collecting the voltage data of the battery cell. The sampling assembly 20 is electrically connected to the casing 12 and the second electrode lead-out part 112, allowing for sampling the voltage of the energy unit 10.

The first electrode lead-out part 111 and the second electrode lead-out part 112 are configured to lead out electrodes from the interior of the pouch battery cell 11, extend them outside the bag for charging and discharging of the battery cell.

The polarities of the first electrode lead-out part 111 and the second electrode lead-out part 112 are opposite. For example, the first electrode lead-out part 111 leads out the positive electrode of the pouch battery cell 11, while the second electrode lead-out part 112 leads out the negative electrode of the pouch battery cell 11. Alternatively, the first electrode lead-out part 111 leads out the negative electrode of the pouch battery cell 11, while the second electrode lead-out part 112 leads out the negative electrode of the pouch battery cell 11.

The first electrode lead-out part 111 is electrically connected to the casing 12, making the first electrode lead-out part 111 have the same electric potential as the casing 12. The sampling assembly 20 monitors the voltage between the second electrode lead-out part 112 and the casing 12, allowing for monitoring the voltage of the pouch battery cell 11 on the same side, thereby reducing the number of sampling harnesses, reducing the number of low-voltage connectors, and saving space.

In some embodiments, the casing 12 has a connecting part (not shown), the connecting part is configured to electrically connect to the sampling assembly 20, a distance between the first electrode lead-out part 111 and the second electrode lead-out part 112 is larger than a distance between the connecting part and the second electrode lead-out part 112.

In the above technical solution, the first electrode lead-out part 111 is electrically connected to the casing 12, and the connecting part of the casing 12 is electrically connected to the sampling assembly 20. With the distance between the first electrode lead-out part 111 and the second electrode lead-out part 112 larger than the distance between the connecting part and the second electrode lead-out part 112, the circuit electrically connecting the sampling assembly 20 to the connecting part and the second electrode lead-out part 112 is simpler, and the number of sampling harnesses can also be reduced.

Specifically, the sampling assembly 20 is connected to the casing 12 via a connecting part. The connecting part may be disposed at a position either close to the second electrode lead-out part 112 or convenient for sampling harness layout, facilitating connection of the sampling assembly 20 and sampling harness layout. Moreover, a connecting part is disposed on the casing 12 facilitating standard assembly, and helping to enhance rapid and accurate connection of the sampling assembly 20 and the casing 12 during mass assembly.

The distance between the first electrode lead-out part 111 and the second electrode lead-out part 112 is larger than the distance between the connecting part and the second electrode lead-out part 112. In this way, fewer sampling harnesses are needed for the sampling assembly 20 to electrically connect to the connecting part and the second electrode lead-out part 112, and the connection circuit is simple. If the sampling assembly 20 is electrically connected to the first electrode lead-out part 111 and the second electrode lead-out part 112, more sampling harnesses are needed and the connection circuit is complex.

In this way, after the first electrode lead-out part 111 is electrically connected to the casing 12, the sampling circuit can be simplified and the number of sampling harnesses can be reduced by connecting the sampling assembly 20 to the casing 12 and the second electrode lead-out part 112.

In some embodiments, the first electrode lead-out part 111 and the second electrode lead-out part 112 are respectively located at two end faces of the pouch battery cell 11 opposite along a first direction, and along the first direction, the distance between the sampling assembly 20 and the first electrode lead-out part 111 is larger than the distance between the sampling assembly 20 and the second electrode lead-out part 112.

In the above technical solution, the electrodes of the battery apparatus 100 are led out from two ends of the pouch battery cell 11 along the first direction, and along the first direction, the distance between the sampling assembly 20 and the first electrode lead-out part 111 is larger than the distance between the sampling assembly 20 and the second electrode lead-out part 112. The first electrode lead-out part 111 is electrically connected to the casing 12, and the sampling assembly 20 is electrically connected to the connecting part of the casing 12 and the second electrode lead-out part 112, allowing the sampling of the pouch battery cell 11. The sampling assembly 20 performs sampling only on the side of the second electrode lead-out part 112 of the pouch battery cell 11. This offers a simpler connection circuit and requires fewer connection harnesses as compared with performing sampling on two sides of the battery apparatus 100.

Specifically, as shown in FIG. 6, the first direction is the left-right direction in the figure. The first electrode lead-out part 111 and the second electrode lead-out part 112 of the pouch battery cell 11 are located respectively on two opposite end faces along the first direction of the pouch battery cell 11, facilitating series and parallel connections of the multiple pouch battery cells 11.

As shown in FIG. 5, in a case that the first electrode lead-out part 111 and the second electrode lead-out part 112 of the pouch battery cell 11 are located respectively on opposing end faces of the pouch battery cell 11 along the first direction, when the sampling assembly 20 samples the voltage of the pouch battery cell 11, a low-voltage harness is added at both the first electrode lead-out part 111 and the second electrode lead-out part for voltage sampling, followed by summary sampling on the two low-voltage harnesses. This requires more connectors for corresponding voltage monitoring, leading to complex harness layout and high cost.

After the first electrode lead-out part 111 is connected to the casing 12, the sampling assembly 20 is on a side of the second electrode lead-out part 112, and along the first direction, the distance between the sampling assembly 20 and the first electrode lead-out part 111 is larger than the distance between the sampling assembly 20 and the second electrode lead-out part 112, and the sampling assembly 20 is electrically connected to the connecting part of the casing 12 and the second electrode lead-out part 112. This solution requires only one connector for voltage sampling, and the harness arrangement is simple, with few harnesses.

In some embodiments, the energy unit 10 includes a first electrode connecting part 101 and a second electrode connecting part 102, the first electrode connecting part 101 is electrically connected to the first electrode lead-out part 111, the second electrode connecting part 102 is electrically connected to the second electrode lead-out part 112, and along the first direction, the first electrode connecting part 101 and the second electrode connecting part 102 are respectively located at two ends of the casing 12. The sampling assembly is located on a side of the pouch battery cell 11 provided with the second electrode connecting part 102.

In the above technical solution, the first electrode connecting part 101 is electrically connected to the first electrode lead-out part 111, and the second electrode connecting part 102 is electrically connected to the second electrode lead-out part 112, allowing the sampling assembly to be disposed on the side of the second electrode connecting part 102 to sample the energy unit 10.

Specifically, the first electrode connecting part 101 and the second electrode connecting part 102 of the energy unit 10 are respectively located at two ends of the casing 12 along the first direction. When the first electrode connecting part 101 is electrically connected to the first electrode lead-out part 111 and the second electrode connecting part 102 is electrically connected to the second electrode lead-out part 112, the sampling assembly can be located on the side with the second electrode connecting part 102. That is, the sampling assembly is disposed on a side of the casing 12 closer to the second electrode connecting part 102 along the first direction to perform sampling.

In some embodiments, the casing 12 includes a first opening 122 and two second openings 123 disposed opposite along the first direction, where the first opening 122 is located on a side of the two second openings 123 along the second direction and communicates with the two second openings 123, with the second direction intersecting the first direction, and the casing 12 further includes a first casing wall 121; the first casing wall 121 is opposite the first opening 122 along the second direction, the energy unit 10 includes a first electrode connecting part 101 and a second electrode connecting part 102 respectively located at two ends of the first casing wall 121 along the first direction, the energy unit 10 includes a first busbar frame 40 and a second busbar frame 60 disposed opposite each other along the first direction, the first busbar frame 40 is electrically connected to the first electrode connecting part 101 and the first electrode lead-out part 111, and the second busbar frame 60 is electrically connected to the second electrode connecting part 102 and the second electrode lead-out part 112.

In the above technical solution, with the first busbar frame 40 and second busbar frame 60, the positive electrode and negative electrode of the pouch battery cell 11 can be led out to positions of the first electrode connecting part 101 and second electrode connecting part 102 on the first casing wall 121, allowing the sampling assembly to perform sampling on the side of the first casing wall 121.

Specifically, the casing 12 includes a first opening 122 and two second openings 123 disposed along the first direction, forming a "U" shaped casing 12. The pouch battery cell 11 is disposed within the "U" shaped casing 12, with the first electrode lead-out part 111 and second electrode lead-out part 112 respectively located at two ends of the first direction of the pouch battery cell 11.

The casing 12 includes the first casing wall 121, and the first casing wall 121 is opposite the first opening 122 along the second direction. The first electrode connecting part 101 and second electrode connecting part 102 of the energy unit 10 are disposed on the first casing wall 121. With the first busbar frame 40 electrically connected to the first electrode connecting part 101 and the first electrode lead-out part 111, and the second busbar frame 60 electrically connected to the second electrode connecting part 102 and the second electrode lead-out part 112, the positive electrode and negative electrode of the pouch battery cell 11 in the first direction can be led to the first electrode connecting part 101 and second electrode connecting part 102 in the second direction. In this way, the sampling assembly can perform sampling on the side of the first casing wall 121.

In some embodiments, the first electrode connecting part 101 is connected to both the first electrode lead-out part 111 and the casing 12, so as to indirectly electrically connect the first electrode lead-out part 111 to the casing 12 through the first electrode connecting part 101.

In the above technical solution, with the first electrode lead-out part 111 electrically connected to the casing 12 via the first electrode connecting part 101, the casing 12 has the same electric potential as the first electrode lead-out part 111.

Specifically, the first electrode connecting part 101 is connected to the first electrode lead-out parts 111 of multiple pouch battery cells and the casing 12, achieving an electrical connection between the first electrode lead-out parts 111 of the pouch battery cells and the casing 12, making the casing 12 have the same electric potential as the first electrode lead-out part 111. Thus, the sampling assembly can be connected to the second electrode connecting part 102 and the casing 12 to implement voltage sampling of the pouch battery cell 11.

In some embodiments, the first busbar frame 40 is connected to both the first electrode lead-out part 111 and the casing 12, so as to indirectly electrically connect the first electrode lead-out part 111 to the casing 12 through the first busbar frame 40.

In the above technical solution, the electrical connection between the casing 12 and the first electrode lead-out part 111 is achieved through the first busbar frame 40. During installation, the first busbar frame 40 is connected to both the first electrode lead-out part 111 and the casing 12 to ensure the casing 12 has the same electric potential as the first electrode lead-out part 111.

Specifically, with the first busbar frame 40 electrically connected to the casing 12 and the first electrode lead-out part 111, the casing 12 has the same electric potential as the first electrode lead-out part 111. Thus, the sampling assembly can be connected to the second electrode connecting part 102 and the casing 12 to implement voltage sampling of the pouch battery cell 11.

In some embodiments, the first electrode lead-out part 111 is directly connected to the casing 12 to establish electrical connection with the casing 12.

In the above technical solution, an electrical connection is directly established between the casing 12 and the first electrode lead-out part 111, allowing continuity between the first electrode lead-out part 111 and the casing 12, making the casing 12 have the same electric potential as the first electrode lead-out part 111.

Specifically, the first electrode lead-out part 111 is directly electrically connected to the casing 12. This is a simple connection manner and can save the internal space of the energy unit 10.

In some embodiments, the sampling assembly is located on an outer side of the first casing wall 121 facing away from the accommodating space, and the sampling assembly is electrically connected to both the second electrode connecting part 102 and the casing 12.

In the above technical solution, the sampling assembly is on the side of the second electrode connecting part 102, and electrically connecting it to the second electrode connecting part 102 and the casing 12 can allow for sampling of the positive electrode and negative electrode of the pouch battery cell 11.

Specifically, the sampling assembly is located on the outer side of the first casing wall 121 facing away from the accommodating space, meaning that it does not affect the size of the energy unit 10 along the first direction. In addition, the first casing wall 121 provides a fixed position for the sampling assembly. In addition, the sampling assembly is disposed between the first box body and the first casing wall 121 of the box, offering a certain protective effect for the sampling assembly.

In some embodiments, the battery apparatus 100 includes an electrical connecting piece 30, and the electrical connecting piece 30 is configured to electrically connect the first electrode lead-out part 111 to the casing 12.

In the above technical solution, the electrical connecting piece 30 is disposed between the first electrode lead-out part 111 of the pouch battery cell 11 and the casing 12 and is electrically connected to the first electrode lead-out part 111 and the casing 12, establishing continuity between the first electrode lead-out part 111 and the casing 12 to allow for the same electric potential between the casing 12 and the first electrode lead-out part 111. Thus, once the sampling assembly 20 is electrically connected to the connecting part of the casing 12, voltage monitoring can be implemented on the side of the second electrode lead-out part 112 of the pouch battery cell 11.

Specifically, as shown in FIG. 6, the electrical connecting piece 30 is disposed between the first electrode lead-out part 111 and the casing 12 to achieve electrical connection between the first electrode lead-out part 111 and the casing 12.

Optionally, the electrical connecting piece 30 includes a wire, allowing for a simple implementation of an electrical connection between the first electrode lead-out part 111 and the casing 12. In addition, the casing 12 having the same electric potential as the first electrode lead-out part 111 allows to accurately obtain the voltage across the first electrode lead-out part 111 and the second electrode lead-out part 112, that is, the voltage of the pouch battery cell 11.

Optionally, the electrical connecting piece 30 includes a conductive connection piece, with one end of the connection piece electrically connected to the first electrode lead-out part 111, and the other end of the connection piece electrically connected to the casing 12. This achieves an electrical connection between the first electrode lead-out part 111 and the casing 12.

Optionally, the electrical connecting piece 30 may include a conductor connecting piece, that is, the electrical connecting piece 30 has excellent conductivity, which can be considered almost no loss when a current passes through the electrical connecting piece 30. The casing 12 and the first electrode lead-out part 111 have the same electric potential, allowing to accurately obtain the voltage between the first electrode lead-out part 111 and the second electrode lead-out part 112, that is, the voltage of the pouch battery cell 11.

Optionally, the electrical connecting piece 30 includes a semiconductor connecting piece, that is, the electrical connecting piece 30 possesses a certain resistance value. In this way, a current passing through the sampling circuit can be small, preventing a high-voltage current caused by a short circuit between the first electrode lead-out part 111 and the second electrode lead-out part 112 of the pouch battery cell 11, while such high-voltage current damages the pouch battery cell 11. It can be understood that with the electrical connecting piece 30 possessing a certain resistance value, the actual voltage value of the pouch battery cell 11 can be obtained based on the obtained sampling voltage, current, and the resistance value of the electrical connecting piece 30.

In some embodiments, a resistance value of the electrical connecting piece 30 is larger than or equal to 1 Ω.

In the above technical solution, the electrical connecting piece 30 has a resistance value, preventing damage to the pouch battery cell 11 caused by a high voltage between the positive electrode and the negative electrode of the pouch battery cell 11 in a case of a short circuit between the two electrodes or between the casings 12 of two pouch battery cells 11. Thus, the electrical connecting piece 30 can protect the battery apparatus 100.

Specifically, to prevent a short circuit between the positive electrode and negative electrode of the pouch battery cell 11 or between the casings 12 of two pouch battery cells 11, the electrical connecting piece 30 with a resistance value is selected to achieve an electrical connection between the first electrode lead-out part 111 and the casing 12.

In a case that the resistance value of the electrical connecting piece 30 is too small, the short-circuit voltage cannot be effectively reduced.

When the resistance value of the electrical connecting piece 30 is too large, the sampling accuracy and sampling speed may be affected, and power loss of the electrical connecting piece 30 may be increased, thus causing a serious heating problem for the pouch battery cell 11. This not only affects the accuracy of the sampling circuit but also may cause thermal damage to other parts of the circuit.

Optionally, the resistance value of the electrical connecting piece 30 is larger than or equal to 1 Ω. For example, the resistance value of the electrical connecting piece 30 can be 1 Ω, 3 Ω, 7 Ω, 15 Ω, 20 Ω, 25 Ω, 30 Ω, 40 Ω, 60 Ω, or any resistance value larger than or equal to 1 Ω.

It can be understood that electrical connecting pieces 30 with multiple resistance values can be used in series, parallel, or series-parallel to ensure that the resistance value of the electrical connecting pieces 30 falls within the above range.

In some embodiments, the electrical connecting piece 30 is configured to limit a current flowing through the casing 12 to less than or equal to 20 A.

In the above technical solution, the electrical connecting piece 30 is disposed between the first electrode lead-out part 111 and the casing 12, limiting the current flowing through the casing 12 to less than or equal to 20 A, and preventing damage to the pouch battery cell 11 caused by a high voltage between the positive electrode and the negative electrode of the pouch battery cell 11 in a case of a short circuit between the two electrodes or between the casings 12 of two pouch battery cells 11. Thus, the electrical connecting piece 30 can protect the battery apparatus 100.

Specifically, the resistance value of the electrical connecting piece 30 is controlled or another current-limiting element (a fuse or breaker) is disposed in the sampling circuit, to make the current flowing through the casing 12 less than or equal to 20 A. This can protect the sampling circuit and pouch battery cell 11.

For example, the electrical connecting piece 30 is configured to limit the current flowing through the casing 12 to 20 A, 18 A, 16 A, 14 A, 12 A, 10 A, 8 A, 6 A, 4 A, 2 A, or any other current value less than 20 A.

In practical usage, the electrical connecting piece 30 with a corresponding resistance value can be selected based on the voltage of the battery apparatus 100 to realize the protective role of the electrical connecting piece 30 on the battery apparatus 100.

In some embodiments, a maximum withstand voltage of the electrical connecting piece 30 is 100 V.

In the above technical solution, the maximum withstand voltage of the electrical connecting piece 30 refers to the maximum voltage that the electrical connecting piece 30 can withstand during design and manufacturing, essentially the highest voltage value that the electrical connecting piece 30 can support. Under specified conditions, the electrical connecting piece 30 can withstand a maximum voltage of 100 V without breakdown or damage. Thus, the reliability of the electrical connecting piece 30 is ensured.

Specifically, the maximum withstand voltage, also known as withstand voltage strength or breakdown voltage, refers to a highest voltage between mutually insulating portions or between an insulating portion and the ground that can be withstood within a specified time without breakdown under the contact of the electrical connecting piece 30.

Under specified conditions, the electrical connecting piece 30 can withstand a maximum voltage of 100 V without breakdown or damage. Thus, when the battery apparatus 100 undergoes a short circuit upon impact or cooling liquid leakage, the electrical connecting piece 30 can withstand the voltage of a battery obtained by connecting multiple pouch battery cells 11 in parallel, thereby ensuring the reliability of the electrical connecting piece 30.

In some embodiments, the electrical connecting piece 30 includes at least one of conductive foam and conductive adhesive.

In the above technical solution, the conductive foam and the conductive adhesive have good conductivity, allowing for a solid electrical connection between the first electrode lead-out part 111 and the casing 12. Additionally, the flexibility of the foam material allows the conductive foam to adhere to various irregular surfaces, offering tight contact and conduction. Under pressure, the conductive foam can maintain its shape and conductivity, resisting deformation or damage and featuring good durability. The conductive adhesive not only provides conductive connectivity but also has high binding strength, and therefore can securely adhere the first electrode lead-out part 111 to the connecting part of the casing 12.

Specifically, the conductive foam, through embedded conductive particles or coatings, offers superior conductivity. The flexibility of the foam allows the conductive foam to adhere to various irregular surfaces, offering good contact and conduction. Under pressure, the conductive foam can maintain its shape and conductive performance, and therefore is not prone to deformation or damage.

The conductive adhesive contains conductive particles, such as metal powder, carbon powder, or graphite. These particles form conductive paths in the adhesive, allowing for excellent conductivity of the conductive adhesive. In addition, the conductive adhesive not only provides conductive connectivity but also has high binding strength, and therefore can securely adhere the first electrode lead-out part 111 to the connecting part of the casing 12, thereby reducing assembly steps.

Connecting the first electrode lead-out part 111 to the connecting part of the casing 12 with the conductive adhesive or the conductive foam allows for good electrical connectivity. Due to irregularities in the structure of the pouch battery cell 11 and varying distances between the first electrode lead-out parts 111 of the pouch battery cells 11 and the casing 12, the usage of the conductive adhesive or conductive foam can allow for a certain discrepancy of distances between the first electrode lead-out parts 111 of different pouch battery cells 11 and the casing 12.

When the conductive adhesive is used, the amount of the conductive adhesive can be selected according to the distance between the first electrode lead-out part 111 and the casing 12, enabling the electrical connecting piece 30 to adapt to different distance between the first electrode lead-out part 111 and the casing 12.

When conductive foam is used, since the conductive foam has a certain thickness, when the distance between the first electrode lead-out part 111 and the casing 12 is too large, compression of the conductive foam is small. When the distance between the first electrode lead-out part 111 and the casing 12 is too small, compression of the conductive foam is large, allowing the electrical connecting piece 30 to adapt to various distances between the first electrode lead-out part 111 and the casing 12. Furthermore, the resistance value of the electrical connecting piece 30 can be controlled by varying the amount of conductive foam used.

In some embodiments, the battery apparatus includes a first busbar frame 40, the first busbar frame 40 is electrically connected to the first electrode lead-out part 111, and the electrical connecting piece connects the first busbar frame 40 and the casing 12 to connect the first busbar frame 40 and the casing 12 in series.

In the above technical solution, the first busbar frame 40 is used for electrical connection between the first electrode lead-out parts 111 of the pouch battery cells 11. The first busbar frame 40 being electrically connected to the first electrode lead-out part 111 can allow the pouch battery cells 11 in the energy unit 10 to be connected in series, forming a complete battery system. This ensures smooth current flow between the pouch battery cells 11, enabling the battery system to output a higher current and higher voltage. Electrically connecting the first busbar frame 40 and the casing 12 through the electrical connecting piece can implement an electrical connection between the first electrode lead-out part 111 and the electrical connecting piece.

Specifically, the first busbar frame 40 is configured to establish an electrical connection between the first electrode lead-out part 111 of the pouch battery cell 11. For example, one energy unit 10 has multiple pouch battery cells 11, the first electrode lead-out part 111 of the pouch battery cell 11 is electrically connected to the first busbar frame 40, and every two adjacent first busbar frames 40 are electrically connected, facilitating electrical connection among multiple pouch battery cells 11.

The first electrode lead-out part 111 is electrically connected to the first busbar frame 40, and the electrical connecting piece 30 is connected to a first busbar frame component and the casing 12, establishing an electrical connection between the casing 12 and the first electrode lead-out part 111.

In an embodiment, a first busbar component includes an electrical connecting piece 30, and the electrical connecting piece 30 is fixedly connected to the first busbar frame 40. When an electrical connection is established between the first busbar frame 40 and the first electrode lead-out part 111, an electrical connection is established between the electrical connecting piece 30 and the casing 12.

In some embodiments, the energy unit 10 includes a first electrode connecting part 101 and a second electrode connecting part 102, the first electrode connecting part 101 is electrically connected to the first electrode lead-out part 111, the second electrode connecting part 102 is electrically connected to the second electrode lead-out part 112, the battery apparatus further includes an insulator 50, and the insulator 50 insulatively connects the second electrode connecting part 102 and the casing 12.

In the above technical solution, the insulator 50 being disposed between the second electrode connecting part 102 and the casing 12 can ensure an insulative connection between the second electrode lead-out part 112 and the casing 12, preventing a short-circuit connection between the positive electrode and negative electrode of the pouch battery cell 11 and ensuring reliable operation of the battery apparatus.

Specifically, the insulator 50 is disposed between the second electrode connecting part 102 and the casing 12 to ensure that the second electrode lead-out part 112 is insulatively connected to the casing 12, preventing a short circuit and mutual interference between the positive electrode and negative electrode of the pouch battery cell 11, thereby allowing normal operation of the sampling circuit and ensuring reliable operation of the battery apparatus 100.

In some embodiments, the energy unit 10 includes a first electrode connecting part 101, a second electrode connecting part 102, a first busbar frame 40, and a second busbar frame 60, where the first busbar frame 40 electrically connects the first electrode connecting part 101 to the first electrode lead-out part 111, and the second busbar frame 60 electrically connects the second electrode connecting part 102 to the second electrode lead-out part 112. The battery apparatus 100 further includes an insulator 50, and the insulator 50 insulatively connects the second busbar frame 60 and the casing 12.

In the above technical solution, the insulative connection between the second busbar frame 60 and the casing 12 can be ensured, preventing a short-circuit connection between the positive electrode and negative electrode of the pouch battery cell 11 and ensuring reliable operation of the battery apparatus.

Specifically, the insulator 50 is disposed between the second busbar frame 60 and the casing 12 to ensure that the second electrode lead-out part 112 is insulatively connected to the casing 12, preventing a short circuit and mutual interference between the positive electrode and negative electrode of the pouch battery cell 11, thereby allowing normal operation of the sampling circuit and ensuring reliable operation of the battery apparatus 100.

In some embodiments, the insulator 50 is made of a plastic material.

In the above technical solution, the plastic material has good insulation performance, can withstand a certain voltage and current, and has good insulation performance, reliability, and stability.

Specifically, plastic materials possess excellent insulation performance, and good heat resistance, corrosion resistance, and mechanical strength, ensuring a reliable insulative connection between the second busbar frame 60 and the casing 12.

In some embodiments, a resistance of the insulator 50 is larger than or equal to 1 MΩ.

In the above technical solution, the insulative connection between the second electrode lead-out part and the casing is achieved by disposing the insulator 50. The insulator 50 has a resistance value larger than or equal to 1 MΩ so that the insulator 50 has a higher ability to impede a current, thereby reducing electric leakage and ensuring the reliable operation of the battery apparatus.

Specifically, a resistance of the insulator 50 being larger than or equal to 1 MΩ can better obstruct a current, reduce electric leakage, and ensure reliable circuit operation. Meanwhile, the high-resistance insulator 50 can endure a higher electric field strength, reducing material aging due to field effects, thereby helping to prolong the service life of the insulator 50 and battery apparatus 100.

Furthermore, the high-resistance insulator 50 can withstand a higher electric field strength, permitting the battery apparatus 100 to operate at a higher voltage, thereby enhancing the power density and efficiency of the battery apparatus 100.

The resistance value of the insulator 50 is larger than or equal to 1 MΩ. For example, the resistance value of the insulator 50 can be 1 MΩ, 2 MΩ, 3 MΩ, 4 MΩ, 5 MΩ, 6 MΩ, 7 MΩ, 8 MΩ, or 9 MΩ, or any other value larger than 1 MΩ.

In some embodiments, the battery apparatus includes multiple energy units 10, each energy unit 10 includes one casing 12 and multiple pouch battery cells 11 arranged side by side in the casing 12, first electrode lead-out parts 111 of the multiple pouch battery cells 11 located in the same casing 12 all face a same side and are connected to each other, and second electrode lead-out parts 112 of the multiple pouch battery cells 11 located in the same casing 12 all face a same side and are connected to each other.

In the above technical solution, the battery apparatus includes the multiple energy units 10, the first electrode lead-out parts 111 of the energy units 10 all face towards the same side and are connected to each other, and the second electrode lead-out parts 112 all face towards the same side and are connected to each other. Thus, in one energy unit 10, the first electrode lead-out part 111 and the second electrode lead-out part 112 are respectively located on two sides of the casing 12 along the first direction. This makes it convenient to arrange the sampling assembly on one side of the energy unit 10.

Specifically, the battery apparatus 100 includes multiple energy units 10, and the multiple energy units 10 may be connected in series or parallel, allowing the energy units 10 to produce a higher output voltage or current.

The first electrode lead-out parts 111 of the energy units 10 all face towards the same side and are connected to each other, and the second electrode lead-out parts 112 all face towards the same side and are connected to each other, facilitating parallel connection among the multiple pouch battery cells 11.

Meanwhile, in an energy unit 10, the first electrode lead-out part 111 and the second electrode lead-out part 112 are located on opposite sides of the casing 12 along the first direction. When the first electrode lead-out part 111 is electrically connected to the casing 12, it is convenient for the sampling assembly 20 to be electrically connected to the casing 12 and the second electrode lead-out part 112, so that the sampling assembly 20 is arranged on one side of the energy unit 10 (on the right as shown in FIG. 5).

When the multiple energy units 10 are arranged, electrode lead-out parts of the same polarity of the pouch battery cells 11 in any two energy units 10 face opposite directions, facilitating connection among the multiple energy units 10.

In arrangement of the multiple energy units 10, the first electrode lead-out part 111 is electrically connected to the casing 12 via the electrical connecting piece 30, and the second electrode lead-out part 112 is insulated from the casing. The sampling assembly 20 is disposed on the second electrode lead-out part 112 and is connected to the second electrode lead-out part 112 via the casing 12, enabling voltage sampling on the same side on the multiple arranged energy units 10.

In some embodiments, an elastic piece 80 is disposed between adjacent pouch battery cells 11 in a same energy unit 10, and/or an elastic piece 80 is arranged between the pouch battery cell 11 and the inner wall of the casing 12 along a direction in which the multiple pouch battery cells 11 are arranged side by side.

In the above technical solution, after swelling, the pouch battery cell 11 can compress the elastic piece, and the elastic piece 80 can absorb the swelling, thereby reducing the outward swelling of the casing 12 to some extent and decreasing the probability of deformation of the casing 12.

Specifically, during extended use, battery apparatus may result in the swelling of pouch battery cell 11. In an embodiment, an elastic piece 80 is disposed between adjacent pouch battery cells 11 within the same energy unit 10, and along a direction in which the multiple pouch battery cells 11 are arranged side by side, an elastic piece 80 is disposed between the pouch battery cells 11 and the inner wall of the casing 12. Thus, when one pouch battery cell 11 of two adjacent pouch battery cells 11 swells, and/or the pouch battery cell 11 adjacent to the inner wall of the casing 12 swells, the elastic piece 80 connected to the swelling pouch battery cell 11 absorbs at least part of the swelling of the pouch battery cell 11, thus reducing the swelling exerted on the casing 12 to some extent and decreasing the outward swelling of the casing 12, thereby reducing the probability of deformation of the casing 12.

Optionally, in an embodiment, an elastic piece 80 is disposed between adjacent pouch battery cells 11 in a same energy unit 10. Optionally, in an embodiment, an elastic piece 80 is arranged between the pouch battery cell 11 and the inner wall of the casing 12 along a direction in which the multiple pouch battery cells 11 are arranged side by side.

Optionally, the elastic piece 80 is insulated from the casing 12 and the pouch battery cell 11. The elastic piece 80 can be made of an insulating material or an insulating layer may be applied externally on the elastic piece. The elastic piece 80 includes but is not limited to springs, foam, silicone, and the like.

In some embodiments, the battery apparatus includes multiple energy units 10, the multiple energy units 10 are arranged in groups, and an insulating layer 81 is disposed on an outer surface of the casing 12, so that casings 12 of two adjacent energy units 10 of the multiple energy units 10 arranged are mutually insulated.

In the above technical solution, the multiple energy units 10 can enhance the performance of the battery apparatus, and the insulating layer 81 can ensure insulation between the casings 12 to some degree, thus providing reliability to the battery apparatus.

Optionally, the multiple energy units 10 can be arranged in groups along the first direction, the second direction, or the first direction and the second direction. The multiple energy units 10 can be connected in series, parallel, or series-parallel. "Series-parallel" may refer to a combination of series and parallel connection of the multiple energy units 10.

When the energy units 10 are connected in series, the power supply voltage of the battery apparatus can be increased, and when the energy units 10 are connected in parallel, the power supply current of the battery apparatus can be increased.

The insulating layer 81 on the outer surface of the casing 12 can ensure mutual insulation between the casings 12 of two adjacent energy units 10 among the arranged multiple energy units 10, preventing a short circuit between the casings 12 of the two adjacent energy units 10 to a certain extent, thereby enhancing the reliability of the battery apparatus.

The material of the insulating layer 81 includes but is not limited to plastic, foam, silicone, and the like. Optionally, the insulating layer 81 can be bound to the outer surface of the casing 12 by gum.

In some embodiments, the energy unit 10 includes a first electrode connecting part 101 and a second electrode connecting part 102, the first electrode connecting part 101 is electrically connected to the first electrode lead-out part 111, the second electrode connecting part 102 is electrically connected to the second electrode lead-out part 112, the multiple energy units 10 are sequentially arranged, and the first electrode connecting parts and second electrode connecting parts of two adjacent energy units 10 have opposite orientations in terms of relative positions, where the adjacent energy units 10 are connected in series.

In the above technical solution, it can be convenient to connect adjacent energy units 10 in series, thereby increasing the power supply voltage of the battery apparatus.

Specifically, the first electrode connecting part 101 and the second connecting part 13 can serve as the positive electrode connecting part and the negative electrode connecting part of the energy unit 10, respectively. The relative position of the first electrode connecting part 101 and the second electrode connecting part 102 of adjacent two energy units 10 being opposite allows the first electrode connecting part 101 of one energy unit 10 to be on the same side of the battery apparatus as the second electrode connecting part 102 of the other energy unit 10, and the second electrode connecting part 102 of one energy unit 10 to be on the same side of the battery apparatus as the first electrode connecting part 101 of the other energy unit 10. Thus, it is convenient to connect the first electrode connecting part 101 and the second electrode connecting part 102 that are on the same side of the adjacent two energy units 10 and connect the second electrode connecting part 102 and the first electrode connecting part 101 that are on the other same side, thereby connecting the adjacent two energy units 10 in series.

Multiple pouch battery cells 11 in one energy unit 10 can be connected in series, parallel, or series-parallel. The first electrode connecting part 101 can be electrically connected to one of the first electrode lead-out parts 111, and the second electrode connecting part 102 can be electrically connected to one of the second electrode lead-out parts 112.

Figure 12:
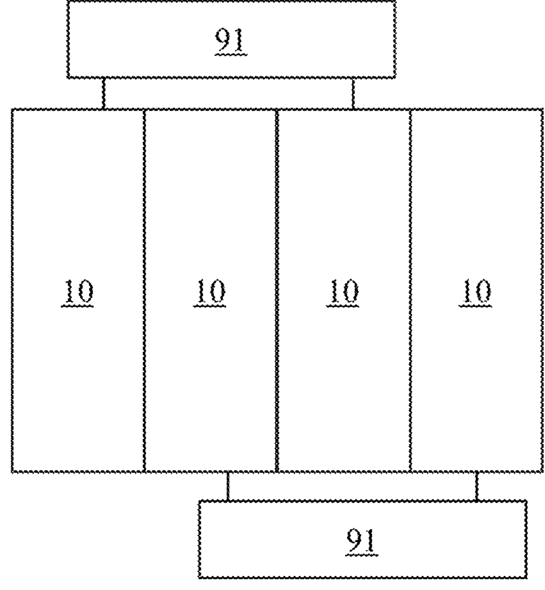
FIG. 12 is a schematic diagram showing a battery apparatus according to some embodiments of this application.

In some embodiments, the energy unit 10 includes a first electrode connecting part 101 and a second electrode connecting part 102, the first electrode connecting part 101 is electrically connected to the first electrode lead-out part 111, and the second electrode connecting part 102 is electrically connected to the second electrode lead-out part 112; and the battery apparatus includes multiple energy units 10 arranged in groups, the battery apparatus further includes busbars 91, the busbars 91 are configured to connect different energy units 10 (FIG. 12), the busbar is connected to at least one first electrode lead-out part 111, and the busbar is connected to the casing 12 of at least one of the energy units 10, so that the first electrode lead-out part 111 is indirectly electrically connected to the casing 12 through the busbar.

In the above technical solution, the busbar can be used to electrically connect the first electrode lead-out part 111 to the casing 12.

Specifically, the busbar 91 can connect to different energy units 10, allowing the different energy units 10 to establish an electrical connection, such as a series, parallel, or series-parallel connection. Optionally, the busbar may include a bus plate.

The busbar is connected to at least one first electrode lead-out part 111 and the casing 12 of at least one energy unit 10, so that the first electrode lead-out part 111 is indirectly electrically connected to the casing 12 through the busbar, and the sampling assembly can be electrically connected to the first electrode lead-out part 111 through the casing 12 and the busbar, facilitating sampling harness layout, reducing the number of sampling harnesses, and also reducing additional connecting pieces.

In some embodiments, the multiple energy units 10 arranged in groups include alternately arranged first energy units **10*a* and second energy units 10*b*, the casing 12 of the first energy unit 10*a* is electrically connected to the busbar 91, and the casing 12 of the second energy unit 10*b* is insulated from the busbar 91**.

In the above technical solution, since the busbar is connected to the multiple energy units 10, the electric potential of the busbar can be transmitted using the casing of only one energy unit 10. This allows for alternate arrangement of charged casings and uncharged casings of the multiple energy units 10 arranged in groups, and therefore allows for a far distance between casings 12 with different electric potentials, thereby reducing the short circuit risk and enhancing reliability.

Specifically, the multiple energy units 10 arranged in groups include alternately arranged first energy units **10*a* and second energy units 10*b*, and the casing 12 of the first energy unit 10*a* is electrically connected to the busbar 91, so that the casing 12 of the first energy unit 10*a* is charged. The casing 12 of the second energy unit 10*b* is insulated from the busbar, rendering the casing 12 of the second energy unit 10*b* uncharged, thus allowing alternating arrangement of charged casings and uncharged casings of the multiple energy units 10 arranged in groups, and increasing the distance between two adjacent charged casings 12**.

Disposing the first energy unit **10*a* between the two adjacent second energy units 10*b* increases the distance between two adjacent uncharged casings 12**, thereby enhancing the safety of the battery apparatus to some extent.

Figure 7:
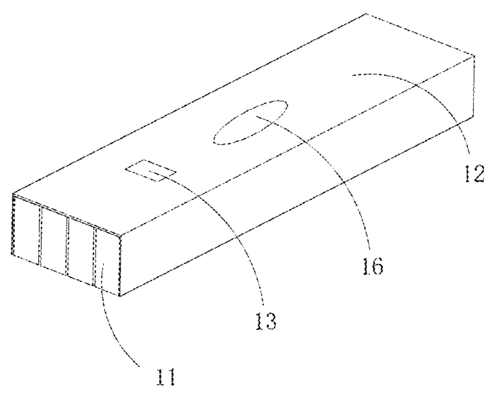
FIG. 7 is another schematic structural diagram of an energy unit according to some embodiments of this application.
Figure 8:
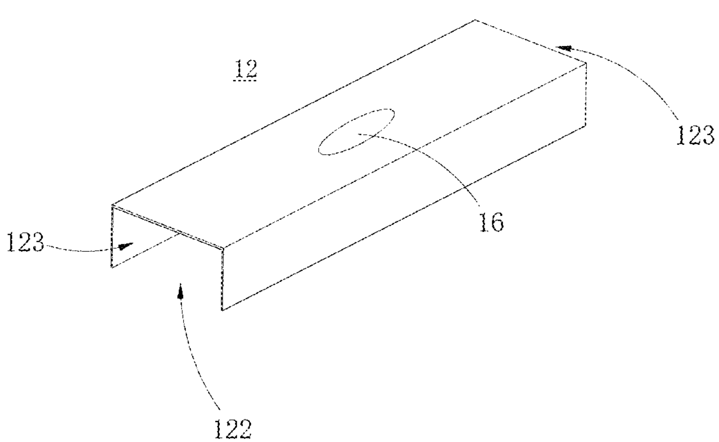
FIG. 8 is a schematic structural diagram of a casing according to some embodiments of this application.
Figure 9:
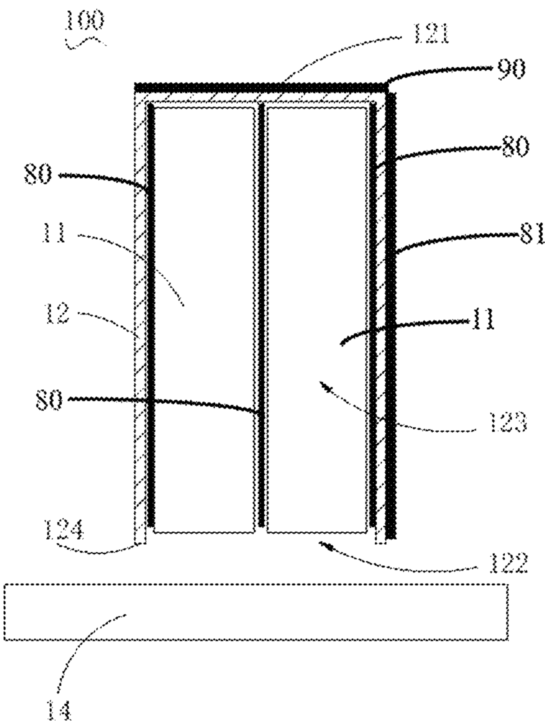
FIGS. 9 and 10 are cross-sectional views of an energy unit according to some embodiments of this application.

In some embodiments, with reference to FIGS. 7 and 8, the casing 12 includes a first opening 122 and two second openings 123 disposed opposite along the first direction, where the first opening 122 is located on a side of the two second openings 123 along the second direction and communicates with the two second openings 123, with the second direction intersecting the first direction, and the battery apparatus includes a box, the energy unit 10 is located on an inner bottom wall of the box, the casing 12 includes two first end walls 124 forming the first opening 122, the first end wall 124 is disposed facing towards the inner bottom wall, and an inner wall surface, an outer wall surface, and a transition wall surface connecting the inner wall surface and the outer wall surface of the first end wall 124 are all provided with an insulating layer 81.

In the above technical solution, insulation can be achieved between the casing 12 and the inner bottom wall of the box.

Optionally, the first opening 122 can be used for placing the pouch battery cell 11 into the casing 12, while the two second openings 123 can be used for respectively connecting the first electrode lead-out part 111 and the second electrode lead-out part 112 of the pouch battery cell 11 to components (such as busbar frames and busbars) outside the casing 12.

Optionally, in an embodiment, with reference to FIGS. 4 and 8, the first direction intersects perpendicularly with the second direction. The first direction may be the left-right direction shown in the figure, and the second direction is the up-down direction as shown in the figure. The first opening 122 is located on a downward side of the two second openings 123 and communicates with the two second openings 123. Optionally, in other embodiments, the first direction and the second direction may intersect obliquely.

The first end wall 124 is disposed facing towards the inner bottom wall, enabling the casing 12 to connect to the inner bottom wall of the box through the two first end walls 124 forming the first opening 122. The inner wall surface, outer wall surface, and transition wall surface connecting the inner wall surface and outer wall surface of first end wall 124 are all provided with an insulating layer 81, so that the first end wall 124 is insulated from the inner bottom wall of the box, thereby providing insulation between the casing 12 and the inner bottom wall of the box.

The insulating layer 81 includes but is not limited to plastic, foam, silicone, or the like.

In some embodiments, the casing 12 includes a first opening 122 and two second openings 123 disposed opposite along the first direction, where the first opening 122 is located on a side of the two second openings 123 along the second direction and communicates with the two second openings 123, with the second direction intersecting the first direction; and the battery apparatus includes a box, the energy unit 10 is located on an inner bottom wall of the box, the casing 12 includes two first end walls 124 forming the first opening 122, and the first end wall 124 and the inner bottom wall of the box are insulatively connected by an insulating adhesive.

In the above technical solution, insulation can be achieved between the casing 12 and the inner bottom wall of the box.

Optionally, the first opening 122 can be used for placing the pouch battery cell 11 into the casing 12, while the two second openings 123 can be used for respectively connecting the first electrode lead-out part 111 and the second electrode lead-out part 112 of the pouch battery cell 11 to components (such as busbar frames and busbars) outside the casing 12.

Optionally, in an embodiment, the first direction intersects perpendicularly with the second direction. The first direction may be the left-right direction shown in the figure, and the second direction is the up-down direction as shown in the figure. The first opening 122 is located on a downward side of the two second openings 123 and communicates with the two second openings 123. Optionally, in other embodiments, the first direction and the second direction may intersect obliquely.

The first end wall 124 and the inner bottom wall of the box are insulatively connected by an insulating adhesive, so that the first end wall 124 is insulated from the inner bottom wall of the box, thereby providing insulation between the casing 12 and the inner bottom wall of the box.

Optionally, the insulating adhesive can also fix the energy unit 10 to the inner bottom wall of the box by fixing the first end wall 124.

In some embodiments, the casing 12 includes a first opening 122 and two second openings 123 disposed opposite along the first direction, where the first opening 122 is located on a side of the two second openings 123 along the second direction and communicates with the two second openings 123, with the second direction intersecting the first direction; and the casing 12 further includes a first casing wall 121, where the first casing wall 121 is opposite the first opening 122 along the second direction, the sampling assembly is located outside the first casing wall 121, and the first casing wall 121 is further provided with a pressure relief structure 16.

In the above technical solution, when the pouch battery cell 11 undergoes gas discharge to relieve pressure caused by thermal runaway induced swelling, the pressure relief structure 16 directs discharged gas to relieve pressure, reducing the risk of running-around gas affecting surrounding pouch battery cells 11 and thus lowering the risk of serious thermal runaway of the energy unit 10. This is conducive to thermal runaway management of the battery apparatus and enhances the reliability of the battery apparatus.

The pressure relief structure 16 refers to any structure or component activated to discharge gas and relieve pressure when the internal pressure of the casing 12 reaches a preset value. For example, the pressure relief structure 16 may be an explosion-proof valve.

Optionally, the pressure relief structure 16 may be configured as, but not limited to, a pressure relief hole, a notch, or a weakened part.

The pressure relief structure 16 may be constructed as a pressure relief hole. When gas discharge of the pouch battery cell 11 leads to increased internal pressure in the casing 12, gas can flow out through the pressure relief hole to discharge gas and relieve pressure.

The notch may refer to an indent or groove on the first casing wall 121 of the casing 12. When the casing 12 is under high internal pressure, the position of the notch has a lower strength than other positions on the first casing wall 121, having a higher probability of rupturing. Gas can break through at the notch position to discharge gas and relieve pressure.

The weakened part may refer to a lower-strength structure formed on the first casing wall 121. For example, the weakened part may refer to a thickness-reduced region on the first casing wall 121 or a structure formed by providing a film-covered opening on the first casing wall 121. When the internal pressure in the casing 12 is high, the probability of breaking at the weakened part increases, allowing gas to break through the weakened part for gas discharge and pressure relief.

The casing 12 is configured to accommodate one or more pouch battery cells 11. When the pouch battery cell 11 undergoes thermal runaway, the gas inside experiences significant volume swelling and causes the housing of the pouch battery cell 11 to rupture, discharging gas outward to relieve pressure. The discharged high-temperature gas causes the pressure relief structure 16 to rupture to discharge gas, and direct the discharged gas towards a certain direction for pressure relief.

Optionally, in an embodiment, the first direction intersects perpendicularly with the second direction. The first direction may be the left-right direction shown in the figure, and the second direction is the up-down direction as shown in the figure. The first opening 122 is located on a downward side of the two second openings 123 and communicates with the two second openings 123. The first casing wall 121 serves as a wall of an upper casing 12. Optionally, in other embodiments, the first direction and the second direction may intersect obliquely.

Optionally, in an embodiment, one or more pressure relief structures 16 can be disposed on the first casing wall 121.

In some embodiments, the sampling assembly and the pressure relief structure 16 are disposed in a staggered manner on the first casing wall 121.

In the above technical solution, when the energy unit 10 undergoes gas discharge to relieve pressure, the sampling assembly is protected to some extent.

Specifically, the sampling assembly and the pressure relief structure 16 are disposed on the first casing wall 121 in a staggered manner, maintaining a considerable distance between the sampling assembly and the pressure relief structure 16. Gas discharged from the pressure relief structure 16 is directly not blasted onto the sampling assembly at close range to damage the sampling assembly, thus protecting the sampling assembly to some degree.

Optionally, in an embodiment, the pressure relief structure 16 is disposed at the top of the casing 12, and the sampling assembly is disposed on the left or right side of the casing 12.

In some embodiments, the casing 12 has a connecting part 13, and the connecting part 13 is configured to electrically connect to the sampling assembly. The sampling assembly is disposed between the connecting part 13 and the second electrode connecting part 102. The energy unit 10 includes the first electrode connecting part 101 and the second electrode connecting part 102, the first electrode connecting part 101 is electrically connected to the first electrode lead-out part 111, and the second electrode connecting part 102 is electrically connected to the second electrode lead-out part 112. The pressure relief structure 16 is disposed between the connecting part 13 and the first electrode connecting part 101.

In the above technical solution, the sampling assembly can be disposed far from the pressure relief structure 16, further reducing or avoiding damage to the sampling assembly during gas discharge of the pressure relief structure 16.

The connecting part 13 is configured to electrically connect to the sampling assembly, allowing the sampling assembly to connect to the first electrode connecting part 101 through the connecting part 13 and the casing 12, thereby connecting to the first electrode lead-out part 111. The sampling assembly can collect parameter information of the first electrode lead-out part 111. The sampling assembly can electrically connect to the second electrode lead-out part 112 through the first electrode connecting part 101 to collect parameter information of the second electrode lead-out part 112.

With reference to FIGS. 7 to 11, the second electrode connecting part 102 and the second electrode lead-out part 112 can be located on the left side of the energy unit 10, while the first electrode connecting part 101 and the first electrode lead-out part 111 can be located on the right side of the energy unit 10. The sampling assembly can be located between the connecting part 13 and the second electrode connecting part 102, and the pressure relief structure 16 is located between the connecting part 13 and the first electrode connecting part 101, distancing the sampling assembly from the pressure relief structure 16, thus further reducing or preventing damage to the sampling assembly during gas discharge of the pressure relief structure 16.

Additionally, disposing the sampling assembly between the connecting part 13 and the second electrode connecting part 102 can also reduce space occupancy of the energy unit 10 in the first direction, facilitating structural compactness of the energy unit 10.

In some embodiments, a protective member 90 is disposed on the outer side of the first casing wall 121, and the protective member 90 is configured to cover the first casing wall 121 of at least one of the energy unit 10.

In the above embodiments, the protective member 90 can, to some extent, prevent a short circuit caused by a high-temperature material from falling back onto an adjacent charged casing 12 after the pressure relief structure 16 discharges gas, thus enhancing the reliability of the battery apparatus.

Specifically, the protective member 90 is configured to cover the first casing wall 121 of at least one energy unit 10, causing the pressure relief structure 16 to be covered by the protective member. When the covered pressure relief structure 16 on the first casing wall 121 discharges gas, the discharged high-temperature material is blocked by the protective member, preventing it from falling back onto the adjacent charged casing 12, thereby avoiding a short circuit of the charged casing 12 and enhancing reliability of the battery apparatus.

In description of the specification, optionally, in an embodiment, the protective member 90 may be a heat-resistant material, like a mica material, to prevent a short circuit caused by a high-temperature material from falling back to connect the adjacent charged casing 12 after the valve is burst open.

Optionally, in an embodiment, the battery apparatus includes multiple protective members, one protective member 90 can cover the first casing wall 121 of a corresponding energy unit 10, and the multiple protective members can be connected along the arrangement direction of the multiple energy units 10.

Optionally, in an embodiment, the battery apparatus includes multiple protective members, and the multiple protective members can be connected along the arrangement direction of the multiple energy units 10. The number of the protective members is less than the number of the energy units 10, and each protective member 90 can cover the first casing walls 121 of two or more energy units 10, the multiple protective members can be connected along the arrangement direction of the multiple energy units 10. In an embodiment, a certain or some protective members can cover the first casing walls 121 of two or more energy units 10, and a certain or some protective members can cover the first casing walls 121 of one corresponding energy unit 10.

Optionally, in an embodiment, the first casing walls 121 of a certain or some energy units 10 are covered by the protective member, and the first casing walls 121 of a certain or some energy units 10 are not covered by the protective member.

Figure 10:
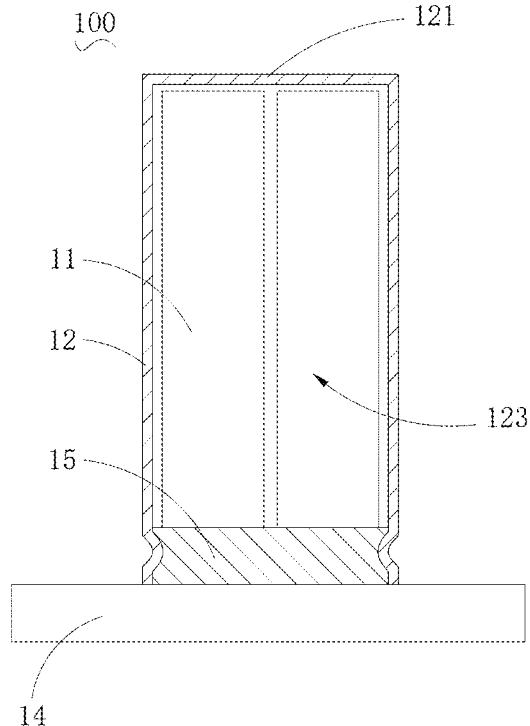
Figure 11:
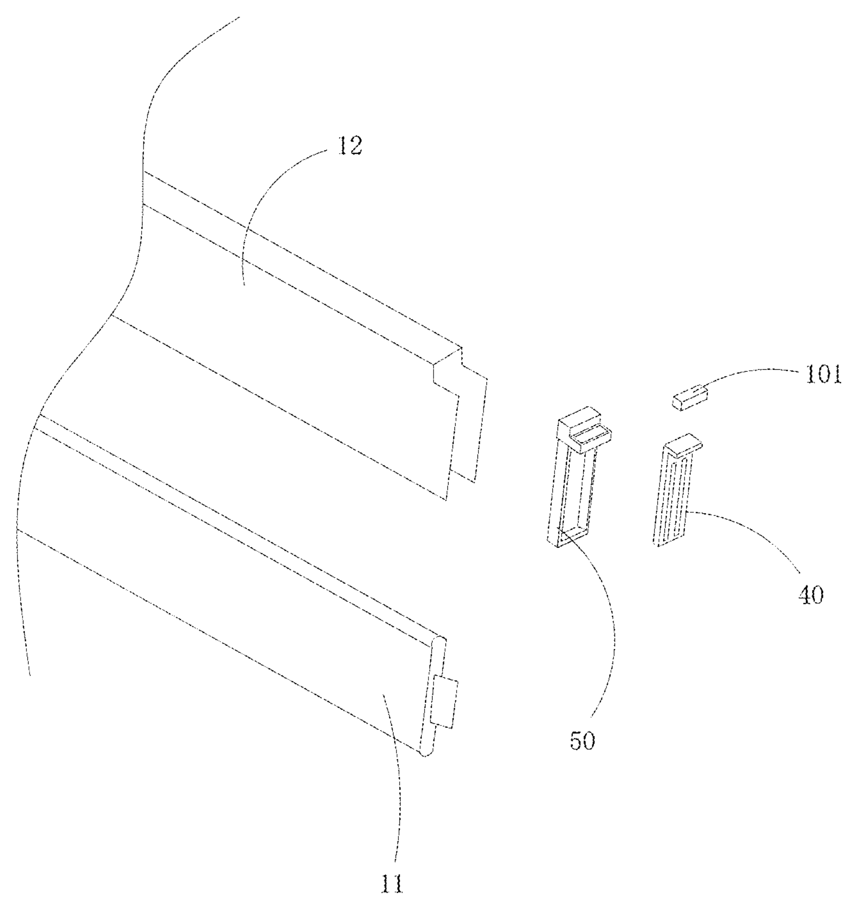
FIG. 11 is a partially exploded schematic view of an energy unit according to some embodiments of this application.

In some embodiments, referring to FIGS. 4 and 10, the battery apparatus includes a box, and the energy unit 10 is located in the box. The casing 12 is connected to the box by thermal conductive adhesive 15.

In the above technical solution, with the box and the casing 12 fixedly connected by thermal conductive adhesive 15, first, the box and the casing 12 can be reliably connected and fixed, and second, heat exchange of the battery apparatus is facilitated.

In some embodiments, the box includes a box body and a heat exchange plate 14, the heat exchange plate 14 is connected to the box body and jointly defines a receiving space with the box body, and the energy unit 10 is adhered to the heat exchange plate 14.

In the above technical solution, with the energy unit 10 adhered to the heat exchange plate 14, the heat exchange plate 14 can efficiently exchange heat with the pouch battery cell 11, quickly adjusting the temperature of the pouch battery cell 11. This helps to enhance the reliability of the pouch battery cell 11, thereby improving the reliability of the battery apparatus.

In some embodiments, the heat exchange plate 14 is disposed at a bottom of the box body.

In the above technical solution, because the heat exchange plate 14 is arranged between the pouch battery cell 11 and the bottom wall of the box, the heat exchange plate 14 not only provides efficient heat exchange to the pouch battery cell 11 but also plays a protective function. The heat exchange plate 14 can play a cushion function when the bottom of the box is subjected to external mechanical impact, reducing damage caused by external mechanical impact to the pouch battery cell 11. This can reduce the risk of damage to the pouch battery cell 11 and increase the reliability of the energy unit 10, thereby improving the reliability of the battery apparatus.

In some embodiments, the pouch battery cell 11 is any one of lithium iron phosphate battery cell, ternary battery cell, and solid-state battery cell.

The solid-state battery cell can be but is not limited to a polymer solid-state battery cell, an oxide solid-state battery cell, a sulfide solid-state battery cell, and a halide solid-state battery cell. The solid-state battery cell can alternatively be a semi-solid-state battery cell or a fully solid-state battery cell.

In the above technical solution, using pouch battery cells 11 of the above types can provide more options for the design of the battery apparatus to meet different usage needs. As a lithium iron phosphate battery cell, the pouch battery cell 11 has advantages of high reliability, long cycle life, light weight, large capacity, and low internal resistance. As a ternary battery cell, the pouch battery cell 11 has advantages of high energy density and good electrochemical performance. As a solid-state battery cell, the pouch battery cell 11 has advantages of high energy density, high reliability, light weight, and good high- and low-temperature performance.

In some embodiments, the pouch battery cell 11 is a lithium iron phosphate battery cell, and in a positive electrode material of the pouch battery cell 11, a ratio of a positive electrode active material, a binder, and a conductive agent is 96:(1-3):(1-3); or the pouch battery cell 11 is a ternary battery cell, and in a positive electrode material of the pouch battery cell 11, a ratio of a positive electrode active material, a binder, and a conductive agent is 96:(2-3):(1-2).

In the above technical solution, when the pouch battery cell 11 is a lithium iron phosphate battery cell, the high proportion of the positive electrode active material means that a larger amount of the substance that can undergo electrochemical reactions can be accommodated within a limited electrode assembly, which is conducive to increasing the capacity and energy density of the battery apparatus. This can allow the lithium iron phosphate battery cell to output more electricity in a case of a small volume and weight, meeting application scenarios with certain energy density requirements. The usage amounts of the binder and the conductive agent falling within the above range reduces the cost of auxiliary materials, thereby lowering the overall cost of the battery apparatus. When the pouch battery cell 11 is a ternary battery cell, due to the relatively complex structure and surface properties of ternary materials, using the positive electrode active material, the binder, and the conductive agent of the above usage ratio helps to ensure good adhesion between positive electrode active material particles and between the active material and the current collector, thereby improving the mechanical stability and integrity of the electrode assembly. This helps to reduce the risk of active material shedding and electrode pulverization during charge and discharge, and extend the cycle life of the battery apparatus.

In some embodiments, the positive electrode of the pouch battery cell 11 may be a positive electrode plate, and the positive electrode plate may include a positive electrode current collector and a positive electrode film layer disposed on at least one surface of the positive electrode current collector, where the positive electrode film layer includes a positive electrode active material.

For example, the positive electrode current collector includes two opposite surfaces in its thickness direction, and the positive electrode film layer is disposed on either or both of the two opposite surfaces of the positive electrode current collector.

For example, the positive electrode current collector may be a metal foil or a composite current collector. For example, in a case of metal foil, stainless steel, copper, aluminum, nickel, baked carbon electrode, carbon, nickel, titanium, silver-treated aluminum, or stainless steel may be used. The composite current collector may include a polymer material matrix and a metal layer. The composite current collector may be formed by forming a metal material (aluminum, aluminum alloy, nickel, nickel alloy, titanium, titanium alloy, silver, silver alloy, or the like) on a polymer material matrix (for example, matrices of polypropylene, polyethylene terephthalate, polybutylene terephthalate, polystyrene, and polyethylene).

For example, when the pouch battery cell 11 in this embodiment of this application is a lithium-ion battery, the positive electrode active material may include at least one of the following materials: phosphate, layered transition metal oxide, and respective modified compounds thereof. Optionally, the positive electrode active material may include a layered transition metal oxide and a modified compound thereof, which helps to increase the energy density of the pouch battery cell 11. However, this application is not limited to such materials, and may alternatively use other conventional well-known materials that can be used as positive electrode film layer for batteries. One type of these positive electrode active materials may be used alone, or two or more of them may be used in combination.

An example of the phosphate may include but is not limited to at least one of lithium iron phosphate (for example, $LiFePO_4$(LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

An example of the layered transition metal oxide may include, but is not limited to, at least one of lithium cobalt oxide (such as $LiCoO_2$), lithium nickel oxide (such as $LiNiO_2$), lithium manganese oxide (such as $LiMnO_2$ or $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (also referred to as NCM333), $LiNi_{0.5}Co_{0.2}Mn_{0.3}O_2$ (also referred to as NCM523), $LiNi_{0.5}Co_{0.25}Mn_{0.25}O_2$ (also referred to as NCM211), $LiNi_{0.6}Co_{0.2}Mn_{0.2}O_2$ (also referred to as NCM622), $LiNi_{0.8}Co_{0.1}Mn_{0.1}O_2$ (also referred to as NCM811), $LiNi_{0.9}Co_{0.05}Mn_{0.05}O_2$ (also referred to as Ni90), lithium nickel cobalt aluminum oxide (such as $LiNi_{0.80}Co_{0.15}Al_{0.05}O_2$) and modified compounds thereof.

When the pouch battery cell 11 in this embodiment of this application is a sodium-ion battery, the positive electrode active material may include but is not limited to at least one of sodium transition metal oxide, polyanionic material (such as phosphate, fluorophosphate, pyrophosphate, and sulfate), and Prussian blue material.

For example, the positive electrode active material for sodium-ion battery may include at least one of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, Prussian blue material, and material with a general formula of $X_pM'_q(PO_4)_rO_xY_{3-x}$. In the general formula $X_pM'_q(PO_4)_rO_xY_{3-x}$, $0<p\leq4$, $0<q\leq2$, $1\leq r\leq3$, $0\leq x\leq2$, X includes at least one of H+, Li+, Na+, K+, and NH4+, M' includes a transition metal cation, optionally at least one of V, Ti, Mn, Fe, Co, Ni, Cu, and Zn, and Y includes a halogen anion, optionally at least one of F, Cl, and Br.

In this embodiment of this application, the above modified compounds of the positive electrode active material can involve subjecting the positive electrode active materials to doping modification and/or surface coating modification, such as carbon coating modification or fast ion conductor coating modification.

During charge-discharge, the pouch battery cell 11 undergoes deintercalation and consumption of active ions like Li, and the molar amounts of Li are different when the pouch battery cell 11 is discharged to different states. In the enumeration of the positive electrode active material in this embodiment of this application, the molar amount of Li is the initial state of the material, that is, the state before feeding. When the positive electrode active material is applied to a battery system, the molar amount of Li may change after a charge-discharge cycle.

In the enumeration of positive electrode active materials in this embodiment of this application, the molar amount of oxygen O is only in theoretical state value. Lattice oxygen release causes fluctuations in the molar amount of oxygen O, resulting in actual fluctuations in the molar amount of oxygen O.

In this embodiment of this application, the element content in the positive electrode active material has the meaning well known in the art, and can be tested by using well-known devices and methods. For example, it can be tested in accordance with EPA 6010D-2014 by using inductively coupled plasma atomic emission spectroscopy, and can be determined by using inductively coupled plasma atomic emission spectroscopy (ICP-OES, instrument model: Thermo ICAP7400). First, 0.4 g of the positive electrode active material is weighed, and 10 mL of aqua regia (with a concentration of 50%) is added. The foregoing solution is placed on a 180° C. plate for 30 min. After digestion is performed on the plate, 100 mL of the solution is taken to conduct quantitative testing by using the standard curve method.

In some embodiments, the positive electrode can use foam metal. The foam metal may be foam nickel, foam copper, foam aluminum, foam alloys, foam carbon, or the like. When the foam metal is used as the positive electrode, the surface of the foam metal may have no positive electrode film layer disposed, or have a positive electrode film layer disposed. For example, inside the foam metal, a lithium source material, potassium metal or sodium metal can be filled or deposited, where the lithium source material includes lithium metal and/or lithium-rich material.

In some embodiments, the positive electrode film layer further optionally includes a positive electrode conductive agent. The positive electrode conductive agent is not limited to a particular type in the embodiments of this application. For example, the positive electrode conductive agent includes at least one of superconducting carbon, conductive graphite, acetylene black, carbon black, Ketjen black, carbon dots, carbon nanotubes, graphene, and carbon nanofiber. In some embodiments, the mass percentage content of the positive electrode conductive agent in the positive electrode film layer is ≤5 wt %.

In some embodiments, the positive electrode film layer further optionally includes a positive electrode binder. The positive electrode binder is not limited to a particular type in the embodiments of this application. For example, the positive electrode binder may include at least one of poly (vinylidene difluoride) (PVDF), polytetrafluoroethylene (PTFE), vinylidene difluoride-tetrafluoroethylene-propylene terpolymer, vinylidene difluoride-hexafluoropropylene-tetrafluoroethylene terpolymer, tetrafluoroethylene-hexafluoropropylene copolymer, and fluorine-containing acrylic resin. In some embodiments, the mass percentage content of the positive electrode binder in the positive electrode film layer is ≤5 wt %.

The positive electrode film layer is usually formed by applying a positive electrode slurry onto the positive electrode current collector, followed by drying and cold-pressing. The positive electrode slurry is typically formed by dispersing the positive electrode active material, the optional conductive agent, the optional binder, and any other components in a solvent and stirring them to uniformity. The solvent may be but is not limited to N-methylpyrrolidone (NMP).

In some embodiments, the negative electrode can be a negative electrode plate. The negative electrode plate can include a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

For example, the negative electrode current collector may be metal foil, foam metal, or a composite current collector. For example, in a case of metal foil, silver surface-treated aluminum or stainless steel, stainless steel, copper, aluminum, nickel, baked carbon, carbon, nickel, titanium, or the like can be used. The foam metal may be foam nickel, foam copper, foam aluminum, foam alloys, foam carbon, or the like. The composite current collector may include a polymer material matrix and a metal layer. The composite current collector may be formed by forming a metal material (copper, copper alloy, nickel, nickel alloy, titanium, titanium alloy, silver, silver alloy, or the like) on a polymer material matrix (for example, matrices of polypropylene, polyethylene terephthalate, polybutylene terephthalate, polystyrene, and polyethylene).

For example, the negative electrode active material may be a negative electrode active material for pouch battery cell 11 well known in the art. For example, the negative electrode active material can include at least one of the following materials: carbon material (for example, the carbon material includes at least one of artificial graphite, natural graphite, soft carbon, hard carbon), silicon-based material, tin-based material, and lithium titanate. The silicon-based material may include at least one of elemental silicon, silicon-oxygen compound, silicon-carbon composite, silicon-nitrogen composite, and silicon alloy. The tin-based material may include at least one of elemental tin, tin-oxygen compound, or tin alloy. However, this application is not limited to such materials, and may alternatively use other conventional well-known materials that can be used as negative electrode film layer for batteries. These negative electrode film layers can be used individually or in combination of two or more.

In some embodiments, the negative electrode active material includes element silicon, and the element silicon may exist in the form of silicon-based material. For example, the silicon-based material may include at least one of elemental silicon, silicon-oxygen compound, silicon-carbon composite, silicon-nitrogen composite, and silicon alloy.

In some embodiments, the mass percentage of the element silicon in the negative electrode film layer is 1 wt % to 32 wt %, optionally 2 wt % to 19 wt %, and further optionally 6 wt % to 13 wt %. In the pouch battery cell 11 system, the mass percentage of the element silicon falling within the above ranges can increase the energy density of the pouch battery cell 11.

In this embodiment of this application, the mass percentage of element silicon in the negative electrode film layer has the meaning well known in the art, and can be tested by using devices and methods well known in the art. For example, the negative electrode plate is soaked in a solvent such as water, the negative electrode active material is separated from the negative electrode current collector, suction filtration is performed to obtain the negative electrode active material, and the negative electrode active material is tested by using an ICAP7400 inductively coupled plasma emission spectrometer of Thermo Fisher Scientific of the USA in accordance with the GB/T30902-2014 standard to obtain the percentage of the element silicon.

In some embodiments, the negative electrode film layer further optionally includes a negative electrode conductive agent. The negative electrode conductive agent is not limited to a particular type in the embodiments of this application. For example, the negative electrode conductive agent may include at least one of superconducting carbon, conductive graphite, acetylene black, carbon black, Ketjen black, carbon dots, carbon nanotubes, graphene, and carbon nanofiber. In some embodiments, the mass percentage of the negative electrode conductive agent in the negative electrode film layer is ≤5 wt %.

In some embodiments, the negative electrode film layer further optionally includes a negative electrode binder. The negative electrode binder is not limited to a particular type in the embodiments of this application. For example, the negative electrode binder may include at least one of styrene-butadiene rubber (SBR), water-soluble unsaturated resin SR-1B, waterborne acrylic resin (for example, polyacrylic acid PAA, polymethylacrylic acid PMAA, and polyacrylic acid sodium PAAS), polyacrylamide (PAM), polyvinyl alcohol (PVA), sodium alginate (SA), and carboxymethyl chitosan (CMCS). In some embodiments, the mass percentage of the negative electrode binder in the negative electrode film layer is ≤5%.

In some embodiments, the negative electrode film layer further optionally includes another additive. For example, the another additive may include a thickener, for example, sodium carboxymethyl cellulose (CMC-Na) or PTC thermistor material. In some embodiments, the percentage of the another additive in the mass of the negative electrode film layer may be ≤2 wt %.

In some embodiments, the material of the positive electrode current collector can be aluminum, and the material of the negative electrode current collector can be copper.

In some embodiments, a separating membrane includes a separator. The separator is not limited to any particular type in this application, and may be any well-known porous separator with good chemical stability and mechanical stability.

The separator is not limited to any particular type in the embodiments of this application, and may be any well-known porous separator with good chemical stability and mechanical stability.

In some embodiments, a material of the separator may include one or more of glass fiber, non-woven fabric, polyethylene, polypropylene, and poly(vinylidene difluoride). The separator may be a single-layer film or a multi-layer composite film, and is not particularly limited. When the separator is a multi-layer composite film, all layers may be made of same or different materials, which is not particularly limited.

In some embodiments, the separator film may include a porous base film and a coating disposed on at least one side of the base film, where the coating may include at least one of inorganic particle or organic particle.

The porous base film may include one or more of polyethylene and polypropylene.

Inorganic particles have good heat resistance and can enhance the overall heat resistance of the separator film. Inorganic particles, within the working voltage range of sodium-ion batteries, typically do not undergo oxidation and reduction reactions with metal dendrites. In other words, inorganic particles are configured not to undergo oxidation and reduction reactions with alkali metal and/or alkaline earth metal at a nominal voltage of sodium-ion batteries.

In some embodiments, the inorganic particle includes one or more of boehmite γ-AlOOH, aluminum oxide Al2O3, aluminum hydroxide Al(OH)3, barium sulfate BaSO4, magnesium oxide MgO, magnesium hydroxide Mg(OH)2, calcium oxide CaO, cerium oxide CeO2, zirconium titanate SrTiO3, barium titanate BaTiO3, and magnesium fluoride MgF2.

In some embodiments, the organic particle includes at least one of polystyrene, polyethylene, polyimide, melamine resin, phenolic resin, polypropylene, polyester (such as polyethylene terephthalate, polyethylene naphthalate, polybutylene terephthalate), polyphenylene sulfide, aramid, polyamide imide, polyimide, butyl acrylate-methyl methacrylate copolymer, and a mixture thereof.

In some embodiments, the pouch battery cell 11 further includes an electrolyte.

During charging and discharging of the battery cell, active ions migrate between the positive electrode plate and the negative electrode plate. The electrolyte functions to conduct active ions between the positive electrode plate and the negative electrode plate. This embodiment of this application does not specifically impose limitation on the type of electrolyte, which may be selected depending on an actual need.

The electrolyte includes an electrolytic salt and a solvent. The electrolytic salt and solvent are not specifically limited to any types, and may be selected depending on actual needs.

In some embodiments, optionally, the electrolyte further includes an additive. For example, the additive may include a negative electrode film-forming additive, or may include a positive electrode film-forming additive, or may include an additive that can improve some performance of a battery, for example, an additive for improving over-charge performance of the battery, an additive for improving high-temperature performance of the battery, or an additive for improving low-temperature performance of the battery.

For example, the additive includes at least one of cyclic carbonate compound containing an unsaturated bond, sulfate compound, sulfite compound, sultone compound, disulfonic compound, nitrile compound, aromatic compound, isocyanate compound, phosphonitrile compound, anhydride, cyclic anhydride compound, phosphite ester compound, phosphate ester compound, borate, and carboxylic ester compound.

It can be understood that when the pouch battery cell 11 is a lithium iron phosphate battery cell, in the positive electrode material of the pouch battery cell 11, the positive electrode active material accounts for 96 parts of the total weight of the positive electrode material, and the binder accounts for 1-3 parts (including but not limited to 1, 1.2, 1.5, 1.8, 2, 2.2, 2.5, 2.8, 3, and so forth) of the total weight of the positive electrode material, and the conductive agent accounts for 1-3 parts (including but not limited to 1, 1.2, 1.5, 1.8, 2, 2.2, 2.5, 2.8, 3, and so forth) of the total weight of the positive electrode material.

For example, when the pouch battery cell 11 is a lithium iron phosphate battery cell, the positive electrode active material is LFP (which can refer to $LiFePO_4$, that is, lithium iron phosphate), the binder can be PVDF (poly(vinylidene difluoride)), and the conductive agent can be conductive carbon black. LFP:PVDF:conductive carbon black can be 96:2:2, that is to say, the total weight of the positive electrode active material is divided into 100 parts, with LFP accounting for 96 parts, PVDF for 2 parts, and the conductive carbon black for 2 parts. The weight of the positive electrode active material can be measured in gram.

When the pouch battery cell 11 is a ternary battery cell, in the positive electrode material of the pouch battery cell 11, the positive electrode active material accounts for 96 parts of the total weight of the positive electrode material, and the binder accounts for 2-3 parts (including but not limited to 2, 2.2, 2.5, 2.8, 3, and so forth) of the total weight of the positive electrode material, and the conductive agent accounts for 1-2 parts (including but not limited to 1, 1.2, 1.5, 1.8, 2, and so forth) of the total weight of the positive electrode material. The ternary battery cell can include, but is not limited to a lithium nickel cobalt manganese oxide system, a lithium nickel cobalt aluminum oxide system, or the like.

For example, the ternary material of the ternary battery cell may be octahedral-type $LiNi_{0.8}Co_{0.1}Mn_{0.1}O_2$, and the positive electrode active material, the binder, and the conductive agent are at a weight part ratio of 96:2.5:1.5, that is to say, the total weight of the positive electrode material is divided into 100 parts, with octahedral-type $LiNi_{0.8}Co_{0.1}Mn_{0.1}O_2$ accounting for 96 parts, the binder for 2.5 parts, and the conductive agent for 1.5 parts.

In the above technical solution, when the pouch battery cell 11 is a lithium iron phosphate battery cell, the high proportion of the positive electrode active material means that a larger amount of the substance that can undergo electrochemical reactions can be accommodated within a limited electrode assembly, which is conducive to increasing the capacity and energy density of the battery apparatus 100. This can allow the lithium iron phosphate battery cell to output more electricity in a case of a small volume and weight, meeting application scenarios with certain energy density requirements. The usage amounts of the binder and the conductive agent falling within the above range reduces the cost of auxiliary materials, thereby lowering the overall cost of the battery apparatus 100. When the pouch battery cell 11 is a ternary battery cell, due to the relatively complex structure and surface properties of ternary materials, using the positive electrode active material, the binder, and the conductive agent of the above usage ratio helps to ensure good adhesion between positive electrode active material particles and between the active material and the current collector, thereby improving the mechanical stability and integrity of the electrode assembly. This helps to reduce the risk of active material shedding and electrode pulverization during charge and discharge, and extend the cycle life of the battery apparatus 100.

In some embodiments, the pouch battery cell 11 is a ternary battery cell, the casing 12 includes a first opening 122, multiple pouch battery cells 11 are housed within the casing 12, the casing 12 further includes a first casing wall 121, the first casing wall 121 is opposite the first opening 122 along the second direction, and the first casing wall 121 is provided with a pressure relief structure 16.

In the above technical solution, when the ternary battery cell undergoes gas discharge to relieve pressure caused by thermal runaway induced swelling, the pressure relief structure 16 can direct discharged gas towards a certain direction to relieve pressure, reducing the risk of running-around gas affecting surrounding ternary battery cells and thus lowering the risk of serious thermal runaway of the energy unit formed by the ternary battery cells. This is conducive to thermal runaway management of the energy unit 10 and enhances the reliability of the energy unit 10 formed by the ternary battery cells 10.

In some embodiments, the pressure relief structure 16 is configured as a pressure relief hole; or the pressure relief structure is configured as a notch; or the pressure relief structure is configured as a weakened part.

In the above technical solution, more options can be provided for the design of the pressure relief structure 16 to meet different usage needs.

In some embodiments, an insulating layer 81 is disposed on the outer surface of the casing 12 to ensure that the casings 12 of two adjacent energy units 10 in the multiple arranged energy units 10 are mutually insulated.

In the above technical solution, the battery apparatus 100 includes the multiple arranged energy units 10, where the energy unit 10 includes the casing 12 and the pouch battery cell 11 inside the casing 12. The casing 12 is electrically connected to the first electrode lead-out part 111 of the pouch battery cell 11, meaning that the casing 12 has the electric potential as the first electrode lead-out part 111. Therefore, the casings 12 of the multiple energy units 10 cannot be in direct contact. Disposing the insulating layer 81 on the outer surface of the casing 12 can ensure mutual insulation between the casings 12 of two adjacent energy units 10, thereby preventing a short circuit caused by mutual contact between the casings 12.

Specifically, since the casing 12 of the energy unit 10 is electrically connected to the first electrode lead-out part 111 of the pouch battery cell 11, insulation is required between adjacent casings 12 when the multiple energy units are arranged together.

Optionally, an insulating film is disposed on the outer surface of the casing 12, where the insulating film is typically made of polymer materials like polyester film (PET). These materials have excellent physical and chemical performance, for example characteristics such as acid and alkali resistance, corrosion resistance, high-voltage tolerance, non-residual glue, flame-retardancy, and anti-explosion.

The insulating film mainly provides electrical insulation, preventing direct contact between the casing 12 of the battery and an external conductive object, thus avoiding short-circuit and electric shock risks. Additionally, the insulating film can effectively prevent moisture and humidity from coming into the battery, thereby protecting the battery from corrosion and damage.

In an embodiment, the insulating film includes a power battery insulating blue film. This type of insulating film is commonly used for external protection of power batteries, made of a PET substrate, and coated with an oil-based acrylic pressure-sensitive adhesive or silicone pressure-sensitive adhesive; exhibits excellent adhesion to steel and aluminum shells, and offers advantages such as resistance to warping, good toughness, scratch resistance, and puncture resistance.

According to a second aspect, this application provides an energy storage apparatus 1 including multiple battery apparatuses 100 according to any one of the multiple embodiments, where the battery apparatus 100 is configured to store or provide electrical energy.

The energy storage apparatus can be used in energy storage plants, wind power generation systems, solar power generation systems, mobile power systems, temporary power supply systems, or the like. The energy storage apparatus can store electrical energy as needed and output electrical energy when appropriate. For example, the energy storage apparatus can store electrical energy during off-peak hours and provide electrical energy to related users or electric apparatuses during peak hours.

According to a third aspect, this application provides an energy storage system including a power conversion apparatus 2 and the energy storage apparatus 1 according to the above embodiment, where the power conversion apparatus 2 is configured to electrically connect a power generation apparatus and the energy storage apparatus 1.

The energy storage system provided in the embodiments of this application can be any power system that needs an energy storage apparatus.

In some embodiments, the energy storage apparatus is an energy storage container or energy storage cabinet.

In some embodiments, the energy storage apparatus can include a cabinet and one or more battery clusters, with the battery clusters accommodated in the cabinet.

In some embodiments, the energy storage apparatus can include modules such as a thermal management module, a main control module, a master control module, a distribution module, and a firefighting module.

For example, the thermal management module can include a liquid cooling unit, where the liquid cooling unit provides cooling liquid through pipes to battery apparatuses for regulating battery cell temperature.

For example, the main control module can serve as a battery management unit of a battery cluster, and is configured to monitor and manage the battery cluster. The main control module can monitor the current, voltage, power, temperature, or other information of the battery cluster. For example, it can control a charge-discharge current, voltage, and the like of the battery cluster. The main control module includes a slave battery management unit SBMU (Slave Battery Management Unit, SBMU), an integration switch, and other modules.

For example, the main control module can serve as a battery management unit of the energy storage apparatus, and is configured to monitor and manage the energy storage apparatus. The main control module can monitor the current, voltage, power, state of charge, temperature, or other information of the energy storage apparatus. For example, it can control the charge and discharge current, voltage, and the like of the energy storage apparatus. For example, the main control module includes an insulation monitoring module IMM (Insulation Monitoring Module, IMM), a master battery management unit MBMU (Master Battery Management Unit, MBMU), an Ethernet ETH (EtherNet, ETH), an optical fiber conversion module, and other modules.

For example, a firefighting system includes a control panel, a detector, an alarm apparatus, and the like for detecting, alerting, or extinguishing fires in the energy storage system.

For example, a distribution device can be configured to distribute power to an electric module of the energy storage apparatus.

In some embodiments, as shown in FIG. 1, the energy storage system can include one or more energy storage apparatuses 1 and a power conversion apparatus 2 (Power Converter System, PCS), and the power conversion apparatus 2 is configured to be connected between a power generation device 3 and the energy storage apparatus 1. The power generation device 3 is configured to generate electrical energy, and the electrical energy generated by the power generation device 3 can be stored in the energy storage apparatus 1 through the power conversion apparatus 2. For example, the power generation device 3 can specifically be a solar panel, a hydropower generation device, a thermal power generation device, a wind power generation device, or the like. The specific type of the power generation device 3 is not limited in this application.

According to a fourth aspect, this application provides an electric apparatus including the battery apparatus 100 according to any one of the above embodiments, the energy storage apparatus 1 according to the above embodiment, or the energy storage system according to the above embodiment, where the battery apparatus 100, the energy storage apparatus 1, or the energy storage system is configured to provide electrical energy to the electric apparatus.

According to a fifth aspect, an embodiment of this application provides a charging network including a charging pile and the energy storage apparatus according to the above embodiment or the energy storage system according to the above embodiment, where the energy storage apparatus or the energy storage system is configured to provide electrical energy to the charging pile.

Figure 2:
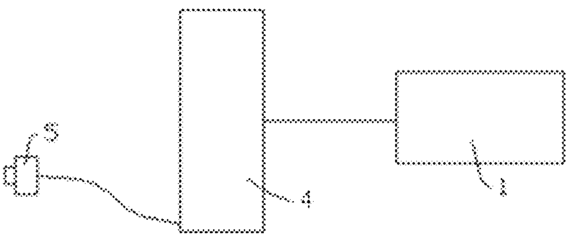
FIG. 2 is a schematic structural diagram of a charging network according to some embodiments of this application.

As shown in FIG. 2, it includes a charging pile 4 and an energy storage apparatus 1, where the charging pile 4 is electrically connected to the energy storage apparatus 1, and the energy storage apparatus 1 is configured to provide electrical energy to the charging pile 4. The charging pile 4 is electrically connected to the battery apparatus in the energy storage apparatus 1 through a cable, where the battery apparatus can supply its stored electrical energy to the charging pile 4. The charging pile 4 has one or more connectors 5, and the connector 5 is configured to connect to an electric apparatus (such as a vehicle) to replenish energy of the electric apparatus.

The energy storage apparatus can be located inside the charging pile (for example, storage charging integrated machine) or outside the charging pile.

In conclusion, it should be noted that the above embodiments are merely intended for describing the technical solutions of this application but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. They should all be covered in the scope of claims and summary in this application. In particular, as long as there is no structural conflict, the various technical features mentioned in the embodiments can be combined in any manner. This application is not limited to the specific embodiments disclosed in this specification but includes all technical solutions falling in the scope of the claims.

What is claimed is:

1. A battery apparatus, comprising an energy unit and a sampling assembly; wherein the energy unit comprises a conductive casing and a plurality of pouch battery cells arranged side by side in the casing, each one of the plurality of pouch battery cells comprises a bag and an electrode assembly housed in the bag, the bag comprises a sealed portion formed through thermal pressing of edges of the bag, an accommodating space is formed in the casing, and the pouch battery cell is accommodated in the accommodating space;

for each one of the plurality of pouch battery cells, the pouch battery cell comprises a first electrode lead-out part and a second electrode lead-out part with opposite polarities, the first electrode lead-out part and the second electrode lead-out part both extend outside the bag and are respectively located at two end faces of the pouch battery cell opposite along the first direction;

the first electrode lead-out part of at least one of the pouch battery cell is electrically connected to the casing, and the second electrode lead-out part is insulated from the casing;

the sampling assembly is electrically connected to the second electrode lead-out part and the casing;

the casing comprises:

a connecting part, the connecting part is configured to electrically connect to the sampling assembly, a distance between the first electrode lead-out part and the second electrode lead-out part is larger than a distance between the connecting part and the second electrode lead-out part;

a first opening;

two second openings opposite along a first direction, wherein the first opening is located on a side of the two second openings along a second direction and communicates with the two second openings, the second direction intersecting the first direction; and a first casing wall, the first casing wall is opposite to the first opening along the second direction, wherein the energy unit comprises:

a first electrode connecting part and a second electrode connecting part respectively located at two ends of the first casing wall along the first direction, the first electrode connecting part is connected to both the first electrode lead-out part and the casing, so that the first electrode lead-out part is indirectly electrically connected to the casing through the first electrode connecting part, the sampling assembly is located on an outer side of the first casing wall facing away from the accommodating space, and the sampling assembly is electrically connected to both the second electrode connecting part and the casing.

2. The battery apparatus according to claim 1, wherein along the first direction, a distance between the sampling assembly and the first electrode lead-out part is larger than a distance between the sampling assembly and the second electrode lead-out part; and, wherein the energy unit comprises a first electrode connecting part and a second electrode connecting part, the first electrode connecting part is electrically connected to the first electrode lead-out part, the second electrode connecting part is electrically connected to the second electrode lead-out part, along the first direction, the first electrode connecting part and the second electrode connecting part are respectively located at two ends of the casing, and the sampling assembly is located on a side of the pouch battery cell provided with the second electrode connecting part.

3. The battery apparatus according to claim 1, wherein the energy unit further comprises a first busbar frame and a second busbar frame opposite along the first direction, the first busbar frame is electrically connected to the first electrode connecting part and the first electrode lead-out part, and the second busbar frame is electrically connected to the second electrode connecting part and the second electrode lead-out part.

4. The battery apparatus according to claim 3, wherein the first busbar frame is connected to both the first electrode lead-out part and the casing, so that the first electrode lead-out part is indirectly electrically connected to the casing through the first busbar frame;

the first electrode lead-out part is directly connected to the casing to be electrically connected to the casing.

5. The battery apparatus according to claim 1, wherein the battery apparatus comprises an electrical connecting piece, and the electrical connecting piece is connected to the first electrode lead-out part and the casing in series.

6. The battery apparatus according to claim 5, wherein the electrical connecting piece has a resistance value larger than or equal to 1 Ω;

the electrical connecting piece is configured to limit a current flowing through the casing to less than or equal to 20 A;

a maximum withstand voltage of the electrical connecting piece is 100 V;

the electrical connecting piece comprises at least one of conductive foam and conductive adhesive; or the battery apparatus comprises a first busbar frame, the first busbar frame is electrically connected to the first electrode lead-out part, and the electrical connecting piece connects the first busbar frame and the casing to connect the first busbar frame and the casing in series.

7. The battery apparatus according to claim 1, wherein the energy unit comprises a first electrode connecting part and a second electrode connecting part, the first electrode connecting part is electrically connected to the first electrode lead-out part, the second electrode connecting part is electrically connected to the second electrode lead-out part, the battery apparatus further comprises an insulator, and the insulator insulatively connects the second electrode connecting part and the casing, wherein a resistance of the insulator is larger than or equal to 1 MΩ.

8. The battery apparatus according to claim 1, wherein the energy unit comprises a first electrode connecting part, a second electrode connecting part, a first busbar frame, and a second busbar frame, the first busbar frame electrically connects the first electrode connecting part and the first electrode lead-out part, and the second busbar frame electrically connects the second electrode connecting part and the second electrode lead-out part;

the battery apparatus further comprises an insulator, and the insulator insulatively connects the second busbar frame and the casing; and the insulator is made of a plastic material.

9. The battery apparatus according to claim 1, wherein the battery apparatus comprises multiple energy units, each energy unit comprises one casing and multiple pouch battery cells arranged side by side in the casing, first electrode lead-out parts of the multiple pouch battery cells located in the same casing all face a same side and are connected to each other, and second electrode lead-out parts of the multiple pouch battery cells located in the same casing all face a same side and are connected to each other, wherein an elastic piece is disposed between adjacent pouch battery cells in a same energy unit, and/or an elastic piece is arranged between the pouch battery cell and an inner wall of the casing along a direction in which the multiple pouch battery cells are arranged side by side.

10. The battery apparatus according to claim 1, wherein the battery apparatus comprises multiple energy units, the multiple energy units are arranged in groups, and an insulating layer is disposed on an outer surface of the casing, so that casings of two adjacent energy units of the multiple energy units arranged are mutually insulated, wherein the energy unit comprises a first electrode connecting part and a second electrode connecting part, the first electrode connecting part is electrically connected to the first electrode lead-out part, the second electrode connecting part is electrically connected to the second electrode lead-out part, the multiple energy units are sequentially arranged, and the first electrode connecting parts and second electrode connecting parts of two adjacent energy units have opposite orientations in terms of relative positions, wherein the adjacent energy units are connected in series.

11. The battery apparatus according to claim 1, wherein the energy unit comprises a first electrode connecting part and a second electrode connecting part, the first electrode connecting part is electrically connected to the first electrode lead-out part, and the second electrode connecting part is electrically connected to the second electrode lead-out part; and the battery apparatus comprises multiple energy units arranged in groups, the battery apparatus further comprises busbars, the busbars are configured to connect different energy units, the busbar is connected to at least one first electrode lead-out part, and the busbar is connected to the casing of at least one of the energy units, so that the first electrode lead-out part is indirectly electrically connected to the casing through the busbar, wherein the multiple energy units arranged in groups comprise alternately arranged first energy units and second energy units, the casing of the first energy unit is electrically connected to the busbar, and a casing of the second energy unit is insulated from the busbar.

12. The battery apparatus according to claim 1, wherein the casing comprises a first opening and two second openings opposite along a first direction, and the first opening is located on a side of the two second openings along a second direction and communicates with the two second openings, the second direction intersecting the first direction; and the battery apparatus comprises a box, the energy unit is located on an inner bottom wall of the box, the casing comprises two first end walls forming the first opening, the first end wall is disposed facing towards the inner bottom wall, and an inner wall surface, an outer wall surface, and a transition wall surface connecting the inner wall surface and the outer wall surface of the first end wall are all provided with an insulating layer; or, wherein the casing comprises a first opening and two second openings opposite along a first direction, and the first opening is located on a side of the two second openings along a second direction and communicates with the two second openings, the second direction intersecting the first direction; and the battery apparatus comprises a box, the energy unit is located on an inner bottom wall of the box, the casing comprises two first end walls forming the first opening, and the first end wall and the inner bottom wall of the box are insulatively connected by an insulating adhesive.

13. The battery apparatus according to claim 1, wherein the casing comprises a first opening and two second openings opposite along a first direction, and the first opening is located on a side of the two second openings along a second direction and communicates with the two second openings, the second direction intersecting the first direction; and the casing further comprises a first casing wall, the first casing wall is opposite to the first opening along the second direction, the sampling assembly is located on an outer side of the first casing wall, and the first casing wall further is disposed with a pressure relief structure.

14. The battery apparatus according to claim 13, wherein the sampling assembly and the pressure relief structure are disposed in a staggered manner on the first casing wall, the casing has a connecting part, the connecting part is configured to electrically connect to the sampling assembly, the energy unit comprises a first electrode connecting part and a second electrode connecting part, the first electrode connecting part is electrically connected to the first electrode lead-out part, the second electrode connecting part is electrically connected to the second electrode lead-out part, the sampling assembly is disposed between the connecting part and the second electrode connecting part, and a pressure relief structure is disposed between the connecting part and the first electrode connecting part; and a protective member is disposed on the outer side of the first casing wall, and the protective member is configured to cover the first casing wall of at least one of the energy unit.

15. The battery apparatus according to claim 1, wherein the battery apparatus comprises a box, the energy unit is located in the box, and the casing is connected to the box by a thermal conductive adhesive, wherein the box comprises a box body and a heat exchange plate, the heat exchange plate is connected to the box body and jointly defines a receiving space with the box body, and the energy unit is adhered to the heat exchange plate, wherein the heat exchange plate is disposed at a bottom of the box body.

16. The battery apparatus according to claim 1, wherein the pouch battery cell is any one of lithium iron phosphate battery cell, ternary battery cell, and solid-state battery cell.

17. The battery apparatus according to claim 16, wherein the pouch battery cell is a ternary battery cell, the casing further comprises a first casing wall, the first casing wall is opposite to the first opening along the second direction, and the first casing wall is disposed with a pressure relief structure; and the pressure relief structure is configured as a pressure relief hole; or the pressure relief structure is configured as a notch; or the pressure relief structure is configured as a weakened part.

18. An energy storage system, comprising a power conversion apparatus and an energy storage apparatus, the energy storage apparatus comprising a battery apparatus according to claim 1, wherein the power conversion apparatus is configured to electrically connect a power generation apparatus and the energy storage apparatus.

19. A charging network, comprising a charging pile and an energy storage system according to claim 18, wherein the energy storage system is configured to provide electrical energy to the charging pile.

* * * * *